United States Patent
Lin et al.

(10) Patent No.: US 11,656,526 B2
(45) Date of Patent: May 23, 2023

(54) SWITCHABLE LIGHT-COLLIMATING LAYER INCLUDING BISTABLE ELECTROPHORETIC FLUID

(71) Applicant: E INK CALIFORNIA, LLC, Fremont, CA (US)

(72) Inventors: Craig Lin, Fremont, CA (US); Xiaolong Zheng, Fremont, CA (US); Yih-Ming Kang, Fremont, CA (US); HongMei Zang, Fremont, CA (US)

(73) Assignee: E Ink California, LLC, Fremont, CA (US)

( * ) Notice: Subject to any disclaimer, the term of this patent is extended or adjusted under 35 U.S.C. 154(b) by 0 days.

(21) Appl. No.: 17/843,460

(22) Filed: Jun. 17, 2022

(65) Prior Publication Data

US 2022/0317541 A1    Oct. 6, 2022
US 2022/0317541 A1    Oct. 6, 2022

Related U.S. Application Data

(63) Continuation of application No. 16/523,470, filed on Jul. 26, 2019, now Pat. No. 11,397,366.

(60) Provisional application No. 62/717,124, filed on Aug. 10, 2018.

(51) Int. Cl.
    *G02F 1/167*    (2019.01)
    *G02F 1/29*     (2006.01)

(52) U.S. Cl.
    CPC ...................................... *G02F 1/29* (2013.01)

(58) Field of Classification Search
    None
    See application file for complete search history.

(56) References Cited

U.S. PATENT DOCUMENTS

| | | |
|---|---|---|
| 5,231,531 A | 7/1993 | Defendini et al. |
| 5,930,026 A | 7/1999 | Jacobson |
| 6,445,489 B1 | 9/2002 | Jacobson et al. |
| 6,504,524 B1 | 1/2003 | Gates et al. |
| 6,512,354 B2 | 1/2003 | Jacobson et al. |
| 6,512,626 B1 | 1/2003 | Schmidt |
| 6,525,865 B2 | 2/2003 | Katase |
| 6,531,997 B1 | 3/2003 | Gates et al. |
| 6,545,797 B2 | 4/2003 | Chen et al. |

(Continued)

FOREIGN PATENT DOCUMENTS

| | | |
|---|---|---|
| CN | 106838849 A | 6/2017 |
| CN | 108375858 A | 8/2018 |

(Continued)

OTHER PUBLICATIONS

Harvey, T.G.; "Replication techniques for micro-optics"; SPIE Proc. vol. 3099, pp. 76-82; 1997. Jan. 1, 1997.

(Continued)

*Primary Examiner* — Thanh Nhan P Nguyen
(74) *Attorney, Agent, or Firm* — Ioannis Constantinides

(57) ABSTRACT

A switchable light-collimating film can be used as a privacy filter for computer monitors or other display devices. The film comprises a plurality of elongated chambers having pigment particles, the position of which can be controlled by the applied electric field. Distribution of the pigment particles throughout the elongated chambers, as opposed to their concentration on one side of the chambers, narrows the viewing angle to the light passing through the film and provides privacy of the viewing images to the user.

14 Claims, 17 Drawing Sheets

(56) References Cited

U.S. PATENT DOCUMENTS

| | | |
|---|---|---|
| 6,672,921 B1 | 1/2004 | Liang et al. |
| 6,693,620 B1 | 2/2004 | Herb et al. |
| 6,751,007 B2 | 6/2004 | Liang et al. |
| 6,751,008 B2 | 6/2004 | Liang et al. |
| 6,753,067 B2 | 6/2004 | Chen et al. |
| 6,753,999 B2 | 6/2004 | Zehner et al. |
| 6,781,745 B2 | 8/2004 | Chung et al. |
| 6,788,449 B2 | 9/2004 | Liang et al. |
| 6,788,452 B2 | 9/2004 | Liang et al. |
| 6,795,229 B2 | 9/2004 | Liang et al. |
| 6,806,995 B2 | 10/2004 | Chung et al. |
| 6,822,782 B2 | 11/2004 | Honeyman et al. |
| 6,825,829 B1 | 11/2004 | Albert et al. |
| 6,825,970 B2 | 11/2004 | Goenaga et al. |
| 6,829,078 B2 | 12/2004 | Liang et al. |
| 6,831,770 B2 | 12/2004 | Liang et al. |
| 6,833,177 B2 | 12/2004 | Chen et al. |
| 6,833,943 B2 | 12/2004 | Liang et al. |
| 6,850,355 B2 | 2/2005 | Liang et al. |
| 6,859,302 B2 | 2/2005 | Liang et al. |
| 6,865,012 B2 | 3/2005 | Liang et al. |
| 6,867,898 B2 | 3/2005 | Liang et al. |
| 6,870,662 B2 | 3/2005 | Tseng et al. |
| 6,885,495 B2 | 4/2005 | Liang et al. |
| 6,900,851 B2 | 5/2005 | Morrison et al. |
| 6,906,779 B2 | 6/2005 | Chan-Park et al. |
| 6,914,714 B2 | 7/2005 | Chen et al. |
| 6,922,276 B2 | 7/2005 | Zhang et al. |
| 6,930,818 B1 | 8/2005 | Liang et al. |
| 6,933,098 B2 | 8/2005 | Chan-Park et al. |
| 6,947,202 B2 | 9/2005 | Liang et al. |
| 6,972,893 B2 | 12/2005 | Chen et al. |
| 6,982,178 B2 | 1/2006 | LeCain et al. |
| 6,987,605 B2 | 1/2006 | Liang et al. |
| 6,995,550 B2 | 2/2006 | Jacobson et al. |
| 7,002,728 B2 | 2/2006 | Pullen et al. |
| 7,005,468 B2 | 2/2006 | Zang et al. |
| 7,012,600 B2 | 3/2006 | Zehner et al. |
| 7,023,420 B2 | 4/2006 | Comiskey et al. |
| 7,034,783 B2 | 4/2006 | Gates et al. |
| 7,046,228 B2 | 5/2006 | Liang et al. |
| 7,050,219 B2 | 5/2006 | Kimura |
| 7,052,571 B2 | 5/2006 | Wang et al. |
| 7,061,166 B2 | 6/2006 | Kuniyasu |
| 7,061,662 B2 | 6/2006 | Chung et al. |
| 7,072,095 B2 | 7/2006 | Liang et al. |
| 7,079,303 B2 | 7/2006 | Hou et al. |
| 7,112,114 B2 | 9/2006 | Liang et al. |
| 7,116,318 B2 | 10/2006 | Amundson et al. |
| 7,116,466 B2 | 10/2006 | Whitesides et al. |
| 7,119,772 B2 | 10/2006 | Amundson et al. |
| 7,141,279 B2 | 11/2006 | Liang et al. |
| 7,144,942 B2 | 12/2006 | Zang et al. |
| 7,156,945 B2 | 1/2007 | Chaug et al. |
| 7,158,282 B2 | 1/2007 | Liang et al. |
| 7,166,182 B2 | 1/2007 | Pereira et al. |
| 7,170,670 B2 | 1/2007 | Webber |
| 7,177,066 B2 | 2/2007 | Chung et al. |
| 7,193,625 B2 | 3/2007 | Danner et al. |
| 7,202,847 B2 | 4/2007 | Gates |
| 7,205,355 B2 | 4/2007 | Liang et al. |
| 7,230,750 B2 | 6/2007 | Whitesides et al. |
| 7,233,429 B2 | 6/2007 | Liang et al. |
| 7,236,292 B2 | 6/2007 | LeCain |
| 7,242,514 B2 | 7/2007 | Chung et al. |
| 7,259,744 B2 | 8/2007 | Arango et al. |
| 7,261,920 B2 | 8/2007 | Haubrich et al. |
| 7,271,947 B2 | 9/2007 | Liang et al. |
| 7,304,780 B2 | 12/2007 | Liu et al. |
| 7,304,787 B2 | 12/2007 | Whitesides et al. |
| 7,307,778 B2 | 12/2007 | Wang et al. |
| 7,312,794 B2 | 12/2007 | Zehner et al. |
| 7,327,346 B2 | 2/2008 | Chung et al. |
| 7,327,511 B2 | 2/2008 | Whitesides et al. |
| 7,339,716 B2 | 3/2008 | Ding et al. |
| 7,342,068 B2 | 3/2008 | Klingenberg et al. |
| 7,347,957 B2 | 3/2008 | Wu et al. |
| 7,349,147 B2 | 3/2008 | Chopra et al. |
| 7,362,485 B2 | 4/2008 | Yamaguchi et al. |
| 7,374,634 B2 | 5/2008 | Wang et al. |
| 7,375,875 B2 | 5/2008 | Whitesides et al. |
| 7,385,751 B2 | 6/2008 | Chen et al. |
| 7,408,696 B2 | 8/2008 | Liang et al. |
| 7,408,699 B2 | 8/2008 | Wang et al. |
| 7,411,719 B2 | 8/2008 | Paolini, Jr. et al. |
| 7,443,571 B2 | 10/2008 | LeCain et al. |
| 7,453,445 B2 | 11/2008 | Amundson |
| 7,470,386 B2 | 12/2008 | Kang et al. |
| 7,492,339 B2 | 2/2009 | Amundson |
| 7,504,050 B2 | 3/2009 | Weng et al. |
| 7,513,813 B2 | 4/2009 | Paolini, Jr. et al. |
| 7,522,332 B2 | 4/2009 | Liang et al. |
| 7,528,822 B2 | 5/2009 | Amundson et al. |
| 7,535,624 B2 | 5/2009 | Amundson et al. |
| 7,545,358 B2 | 6/2009 | Gates et al. |
| 7,557,981 B2 | 7/2009 | Liang et al. |
| 7,560,004 B2 | 7/2009 | Pereira et al. |
| 7,561,324 B2 | 7/2009 | Duthaler et al. |
| 7,564,614 B2 | 7/2009 | Chen et al. |
| 7,572,491 B2 | 8/2009 | Wang et al. |
| 7,580,180 B2 | 8/2009 | Ho et al. |
| 7,583,251 B2 | 9/2009 | Arango et al. |
| 7,602,374 B2 | 10/2009 | Zehner et al. |
| 7,612,760 B2 | 11/2009 | Kawai |
| 7,616,374 B2 | 11/2009 | Chen et al. |
| 7,636,191 B2 | 12/2009 | Duthaler et al. |
| 7,649,666 B2 | 1/2010 | Isobe et al. |
| 7,679,599 B2 | 3/2010 | Kawai |
| 7,679,813 B2 | 3/2010 | Liang et al. |
| 7,679,814 B2 | 3/2010 | Paolini, Jr. et al. |
| 7,683,606 B2 | 3/2010 | Kang et al. |
| 7,684,108 B2 | 3/2010 | Wang et al. |
| 7,688,297 B2 | 3/2010 | Zehner et al. |
| 7,715,087 B2 | 5/2010 | Hou et al. |
| 7,715,088 B2 | 5/2010 | Liang et al. |
| 7,728,811 B2 | 6/2010 | Albert et al. |
| 7,729,039 B2 | 6/2010 | LeCain et al. |
| 7,733,311 B2 | 6/2010 | Amundson et al. |
| 7,733,335 B2 | 6/2010 | Zehner et al. |
| 7,751,667 B2 | 7/2010 | Daniel et al. |
| 7,767,126 B2 | 8/2010 | Kang et al. |
| 7,787,169 B2 | 8/2010 | Abramson et al. |
| 7,791,782 B2 | 9/2010 | Paolini, Jr. et al. |
| 7,817,361 B2 | 10/2010 | Mimura et al. |
| 7,826,129 B2 | 11/2010 | Wu et al. |
| 7,839,564 B2 | 11/2010 | Whitesides et al. |
| 7,843,621 B2 | 11/2010 | Danner et al. |
| 7,843,624 B2 | 11/2010 | Danner et al. |
| 7,859,742 B1 | 12/2010 | Chiu et al. |
| 7,880,958 B2 | 2/2011 | Zang et al. |
| 7,903,319 B2 | 3/2011 | Honeyman et al. |
| 7,952,557 B2 | 5/2011 | Amundson |
| 7,952,791 B2 | 5/2011 | Yanagisawa et al. |
| 7,956,841 B2 | 6/2011 | Albert et al. |
| 7,982,479 B2 | 7/2011 | Wang et al. |
| 7,999,787 B2 | 8/2011 | Amundson et al. |
| 8,002,948 B2 | 8/2011 | Haubrich et al. |
| 8,026,880 B2 | 9/2011 | Mimura et al. |
| 3,034,209 A1 | 10/2011 | Danner et al. |
| 8,068,272 B2 | 11/2011 | LeCain et al. |
| 8,077,141 B2 | 12/2011 | Duthaler et al. |
| 8,077,381 B2 | 12/2011 | LeCain et al. |
| 8,114,262 B2 | 2/2012 | Kang et al. |
| 8,125,501 B2 | 2/2012 | Amundson et al. |
| 8,139,050 B2 | 3/2012 | Jacobson et al. |
| 8,154,790 B2 | 4/2012 | Wang et al. |
| 8,169,690 B2 | 5/2012 | Lin et al. |
| 8,174,490 B2 | 5/2012 | Whitesides et al. |
| 8,177,942 B2 | 5/2012 | Paolini, Jr. et al. |
| 8,179,589 B2 | 5/2012 | Wu et al. |
| 8,213,082 B2 | 7/2012 | Gaides et al. |
| 8,243,013 B1 | 8/2012 | Sprague et al. |
| 8,274,472 B1 | 9/2012 | Wang et al. |
| 8,289,250 B2 | 10/2012 | Zehner et al. |

(56) References Cited

U.S. PATENT DOCUMENTS

| | | |
|---|---|---|
| 8,300,006 B2 | 10/2012 | Zhou et al. |
| 8,305,341 B2 | 11/2012 | Arango et al. |
| 8,314,784 B2 | 11/2012 | Ohkami et al. |
| 8,339,538 B2 | 12/2012 | Uehara et al. |
| 8,361,356 B2 | 1/2013 | Zang et al. |
| 8,373,649 B2 | 2/2013 | Low et al. |
| 8,384,658 B2 | 2/2013 | Albert et al. |
| 8,390,301 B2 | 3/2013 | Danner et al. |
| 8,441,432 B2 | 5/2013 | Zang et al. |
| 8,456,414 B2 | 6/2013 | Lin et al. |
| 8,462,102 B2 | 6/2013 | Wong et al. |
| 8,482,835 B2 | 7/2013 | LeCain |
| 8,514,168 B2 | 8/2013 | Chung et al. |
| 8,520,292 B2 | 8/2013 | Liang et al. |
| 8,537,105 B2 | 9/2013 | Chiu et al. |
| 8,553,315 B2 | 10/2013 | Sato |
| 8,558,783 B2 | 10/2013 | Wilcox et al. |
| 8,558,785 B2 | 10/2013 | Zehner et al. |
| 8,558,786 B2 | 10/2013 | Lin |
| 8,558,855 B2 | 10/2013 | Sprague et al. |
| 8,576,164 B2 | 11/2013 | Sprague et al. |
| 8,576,259 B2 | 11/2013 | Lin et al. |
| 8,582,197 B2 | 11/2013 | Liang et al. |
| 8,593,396 B2 | 11/2013 | Amundson et al. |
| 8,605,032 B2 | 12/2013 | Liu et al. |
| 8,611,692 B2 | 12/2013 | Nimnual et al. |
| 8,625,188 B2 | 1/2014 | Wang et al. |
| 8,643,595 B2 | 2/2014 | Chung et al. |
| 8,665,206 B2 | 3/2014 | Lin et al. |
| 8,681,191 B2 | 3/2014 | Yang et al. |
| 8,730,153 B2 | 5/2014 | Sprague et al. |
| 8,786,929 B2 | 7/2014 | LeCain et al. |
| 8,810,525 B2 | 8/2014 | Sprague |
| 8,830,553 B2 | 9/2014 | Patry et al. |
| 8,830,561 B2 | 9/2014 | Zang et al. |
| 8,854,721 B2 | 10/2014 | Danner et al. |
| 8,891,156 B2 | 11/2014 | Yang et al. |
| 8,928,562 B2 | 1/2015 | Gates et al. |
| 8,928,641 B2 | 1/2015 | Chiu et al. |
| 8,976,444 B2 | 3/2015 | Zhang et al. |
| 9,013,394 B2 | 4/2015 | Lin |
| 9,019,197 B2 | 4/2015 | Lin |
| 9,019,198 B2 | 4/2015 | Lin et al. |
| 9,019,318 B2 | 4/2015 | Sprague et al. |
| 9,025,234 B2 | 5/2015 | Lin |
| 9,075,280 B2 | 7/2015 | Whitesides |
| 9,081,250 B2 | 7/2015 | Liang et al. |
| 9,082,352 B2 | 7/2015 | Cheng et al. |
| 9,171,508 B2 | 10/2015 | Sprague et al. |
| 9,218,773 B2 | 12/2015 | Sun et al. |
| 9,224,338 B2 | 12/2015 | Chan et al. |
| 9,224,342 B2 | 12/2015 | Sprague et al. |
| 9,224,344 B2 | 12/2015 | Chung et al. |
| 9,229,253 B2 | 1/2016 | Schwartz et al. |
| 9,229,261 B2 | 1/2016 | Schwartz et al. |
| 9,230,492 B2 | 1/2016 | Harrington et al. |
| 9,238,340 B2 | 1/2016 | Kayal et al. |
| 9,251,736 B2 | 2/2016 | Lin et al. |
| 9,262,973 B2 | 2/2016 | Wu et al. |
| 9,269,311 B2 | 2/2016 | Amundson |
| 9,279,906 B2 | 3/2016 | Kang |
| 9,291,872 B1 | 3/2016 | Lin et al. |
| 9,299,294 B2 | 3/2016 | Lin et al. |
| 9,310,661 B2 | 4/2016 | Wu et al. |
| 9,346,987 B2 | 5/2016 | Wang et al. |
| 9,366,935 B2 | 6/2016 | Du et al. |
| 9,372,380 B2 | 6/2016 | Du et al. |
| 9,373,289 B2 | 6/2016 | Sprague et al. |
| 9,388,307 B2 | 7/2016 | Li et al. |
| 9,390,066 B2 | 7/2016 | Smith et al. |
| 9,390,661 B2 | 7/2016 | Chiu et al. |
| 9,412,314 B2 | 8/2016 | Amundson et al. |
| 9,436,057 B2 | 9/2016 | Kang et al. |
| 9,436,058 B2 | 9/2016 | Li et al. |
| 9,459,472 B2 | 10/2016 | Kim et al. |
| 9,460,666 B2 | 10/2016 | Sprague et al. |
| 9,470,917 B2 | 10/2016 | Lin et al. |
| 9,495,918 B2 | 11/2016 | Harrington et al. |
| 9,500,888 B2 | 11/2016 | Schwartz et al. |
| 9,501,981 B2 | 11/2016 | Lin et al. |
| 9,513,743 B2 | 12/2016 | Sjodin et al. |
| 9,514,667 B2 | 12/2016 | Lin |
| 9,542,895 B2 | 1/2017 | Gates et al. |
| 9,554,495 B2 | 1/2017 | Danner et al. |
| 9,564,088 B2 | 2/2017 | Wilcox et al. |
| 9,612,502 B2 | 4/2017 | Danner et al. |
| 9,620,048 B2 | 4/2017 | Sim et al. |
| 9,620,067 B2 | 4/2017 | Harrington et al. |
| 9,672,766 B2 | 6/2017 | Sjodin |
| 9,691,333 B2 | 6/2017 | Cheng et al. |
| 9,697,778 B2 | 7/2017 | Telfer et al. |
| 9,721,495 B2 | 8/2017 | Harrington et al. |
| 9,733,540 B2 | 8/2017 | LeCain et al. |
| 9,759,978 B2 | 9/2017 | Liu |
| 9,792,861 B2 | 10/2017 | Chang et al. |
| 9,792,862 B2 | 10/2017 | Hung et al. |
| 9,841,653 B2 | 12/2017 | Wu et al. |
| 9,874,799 B2 | 1/2018 | Shiota |
| 9,897,832 B2 | 2/2018 | Shiota |
| 9,898,114 B2 | 2/2018 | Kwak et al. |
| 9,904,080 B2 | 2/2018 | Shiota |
| 9,904,142 B2 | 2/2018 | Shiota |
| 9,919,553 B2 | 3/2018 | Kang et al. |
| 9,921,451 B2 | 3/2018 | Telfer et al. |
| 9,966,018 B2 | 5/2018 | Gates et al. |
| 10,013,947 B2 | 7/2018 | Ek et al. |
| 10,109,226 B2 | 10/2018 | Joo et al. |
| 10,209,530 B2 | 2/2019 | Telfer et al. |
| 10,229,641 B2 | 3/2019 | Yang et al. |
| 10,241,355 B2 | 3/2019 | Alkhimenko et al. |
| 10,274,773 B2 | 4/2019 | Wu et al. |
| 10,319,313 B2 | 6/2019 | Harris et al. |
| 10,338,446 B2 | 7/2019 | Matsukizono |
| 10,339,876 B2 | 7/2019 | Lin et al. |
| 10,435,566 B2 | 10/2019 | Farrand et al. |
| 10,466,564 B2 | 11/2019 | Kayal et al. |
| 10,573,222 B2 | 2/2020 | Paolini, Jr. et al. |
| 10,672,350 B2 | 6/2020 | Amundson et al. |
| 10,712,628 B2 | 7/2020 | Wu et al. |
| 11,016,336 B2 | 5/2021 | Large |
| 11,016,599 B2 | 5/2021 | Ito |
| 11,048,036 B2 | 6/2021 | Ma et al. |
| 11,086,185 B2 | 8/2021 | Shiota et al. |
| 11,131,882 B2 | 9/2021 | Zhang et al. |
| 11,187,957 B2 | 11/2021 | Takaya et al. |
| 2002/0188053 A1 | 12/2002 | Zang et al. |
| 2003/0102858 A1 | 6/2003 | Jacobson et al. |
| 2003/0175480 A1 | 9/2003 | Chen et al. |
| 2003/0175481 A1 | 9/2003 | Chen et al. |
| 2003/0179437 A1 | 9/2003 | Liang et al. |
| 2003/0203101 A1 | 10/2003 | Haubrich et al. |
| 2004/0120024 A1 | 6/2004 | Chen et al. |
| 2004/0219306 A1 | 11/2004 | Wang et al. |
| 2004/0246562 A1 | 12/2004 | Chung et al. |
| 2005/0253777 A1 | 11/2005 | Zehner et al. |
| 2006/0187187 A1 | 8/2006 | Johnson et al. |
| 2007/0091418 A1 | 4/2007 | Danner et al. |
| 2007/0103427 A1 | 5/2007 | Zhou et al. |
| 2007/0176912 A1 | 8/2007 | Beames et al. |
| 2007/0237962 A1 | 10/2007 | Liang et al. |
| 2008/0020007 A1 | 1/2008 | Zang |
| 2008/0024429 A1 | 1/2008 | Zehner |
| 2008/0024482 A1 | 1/2008 | Gates et al. |
| 2008/0136774 A1 | 6/2008 | Harris et al. |
| 2008/0303780 A1 | 12/2008 | Sprague et al. |
| 2009/0168067 A1 | 7/2009 | LeCain et al. |
| 2009/0174651 A1 | 7/2009 | Jacobson et al. |
| 2009/0322721 A1 | 12/2009 | Zehner et al. |
| 2010/0194733 A1 | 8/2010 | Lin et al. |
| 2010/0194789 A1 | 8/2010 | Lin et al. |
| 2010/0220121 A1 | 9/2010 | Zehner et al. |
| 2010/0265561 A1 | 10/2010 | Gates et al. |
| 2011/0063314 A1 | 3/2011 | Chiu et al. |
| 2011/0164301 A1 | 7/2011 | Paolini, Jr. et al. |

(56) References Cited

U.S. PATENT DOCUMENTS

| | | |
|---|---|---|
| 2011/0175875 A1 | 7/2011 | Lin et al. |
| 2011/0193840 A1 | 8/2011 | Amundson et al. |
| 2011/0193841 A1 | 8/2011 | Amundson et al. |
| 2011/0199671 A1 | 8/2011 | Amundson et al. |
| 2011/0221740 A1 | 9/2011 | Yang et al. |
| 2011/0286081 A1 | 11/2011 | Jacobson |
| 2012/0001957 A1 | 1/2012 | Liu et al. |
| 2012/0098740 A1 | 4/2012 | Chiu et al. |
| 2013/0063333 A1 | 3/2013 | Arango et al. |
| 2013/0249782 A1 | 9/2013 | Wu et al. |
| 2014/0009817 A1 | 1/2014 | Wilcox et al. |
| 2014/0011913 A1 | 1/2014 | Du et al. |
| 2014/0049808 A1 | 2/2014 | Yang |
| 2014/0050814 A1 | 2/2014 | Kang et al. |
| 2014/0204012 A1 | 7/2014 | Wu et al. |
| 2014/0240210 A1 | 8/2014 | Wu et al. |
| 2014/0253425 A1 | 9/2014 | Zalesky et al. |
| 2014/0293398 A1 | 10/2014 | Wang et al. |
| 2015/0098124 A1 | 4/2015 | Li et al. |
| 2015/0262255 A1 | 9/2015 | Khajehnouri et al. |
| 2015/0262551 A1 | 9/2015 | Zehner et al. |
| 2016/0059442 A1 | 3/2016 | Kang et al. |
| 2016/0140910 A1 | 5/2016 | Amundson |
| 2016/0170106 A1 | 6/2016 | Wang et al. |
| 2016/0180777 A1 | 6/2016 | Lin et al. |
| 2017/0097555 A1 | 4/2017 | Lattes et al. |
| 2017/0108753 A1 | 4/2017 | Lam et al. |
| 2017/0219859 A1 | 8/2017 | Christophy |
| 2017/0315406 A1 | 11/2017 | Sasaki |
| 2018/0052357 A1 | 2/2018 | Li |
| 2018/0173073 A1 | 6/2018 | Wu et al. |
| 2019/0005891 A1 | 1/2019 | Wu et al. |
| 2019/0011616 A1 | 1/2019 | Wu et al. |
| 2019/0107765 A1 | 4/2019 | Whitehead et al. |
| 2020/0050010 A1 | 2/2020 | Zheng et al. |
| 2020/0050075 A1 | 2/2020 | Lin et al. |
| 2020/0209702 A1 | 7/2020 | Qu et al. |

FOREIGN PATENT DOCUMENTS

| | | |
|---|---|---|
| JP | 2007206373 A | 8/2007 |
| JP | 2008152017 A | 7/2008 |
| JP | 2013190763 A | 9/2013 |
| KR | 20170008169 A | 1/2017 |
| TW | 201706685 A | 2/2017 |
| WO | 2017074307 A1 | 5/2017 |
| WO | 2018067147 A1 | 4/2018 |

OTHER PUBLICATIONS

Fayer et al., "Water dynamics in large and small reverse micelles: From two ensembles to collective behavior"; J. Chem. Phys., 131, 14704 (2009) Jul. 7, 2009.

Korean Intellectual Property Office, PCT/US2019/043888, International Search Report and Written Opinion, dated Nov. 18, 2019. dated Nov. 18, 2019.

Korean Intellectual Property Office, PCT/US2019/045837, International Search Report and Written Opinion, dated Nov. 25, 2019. dated Nov. 25, 2019.

Korean Intellectual Property Office, PCT/US2019/045835, International Search Report and Written Opinion, dated Nov. 29, 2019. dated Nov. 29, 2019.

European Patent Office, "Extended European Search Report", EP Appl. No. 19846231.9, dated Apr. 25, 2022. dated Apr. 25, 2022.

European Patent Office, "European Search Report", EP Appl. No. 19847363.9, dated Apr. 4, 2022. dated Apr. 4, 2022.

European Patent Office, "Extended European Search Report", EP Appl. No. 19848413.1, dated May 6, 2022. dated May 6, 2022.

SWITCHABLE LIGHT-COLLIMATING LAYER INCLUDING BISTABLE ELECTROPHORETIC FLUID

This application claims priority to U.S. patent application Ser. No. 16/523,470, filed on Jul. 26, 2019, published on Feb. 13, 2020 as US 20200050075 A1, which claims the benefit of U.S. Provisional Application Ser. No. 62/717,124 filed on Aug. 10, 2018, which is incorporated by reference in its entirety.

BACKGROUND OF INVENTION

This invention relates to switchable light-collimating films that can be used, e.g., to control the directionality of incident light passing through a transparent or translucent substrate. Passive films that have this ability have been commercially available for some time, and are widely sold for use as "privacy filters" for computer monitors. See, e.g., offerings from 3M Corporation, St. Paul, Minn., as well as various US patents, such as U.S. Pat. No. 8,213,082. Typically, a privacy filter is applied to the front surface of a video display when the user wants to limit the images on the display to a "privacy cone" that is only viewable by the user. Privacy films typically employ microfabricated channels of plastic that are backfilled with materials having a different index of refraction from the plastic substrate. The interface between materials creates a refractive surface and only light that is oriented in the correct direction will pass through the filter, while other incident light that is oriented in the incorrect direction will be back-reflected and/or absorbed. This same technology can also be used as a window treatment to modify the directionality of, e.g., sunlight passing through an exterior window.

Several groups have attempted to make an active media that can be switched between a privacy and non-privacy state. For example, U.S. Patent Publication 2016/0179231 ('231 Application) describes an electroactive privacy layer that can be used in conjunction with a display device. The '231 Application teaches to use an electrically anisotropic material, such as a dielectric polymer. When an electric field is applied, the anisotropic material is aligned with the field, collimating the light and providing a zone of privacy for the user. However, it is necessary to provide a constant electric potential to the privacy layer to keep the material aligned to maintain the privacy state. Because the privacy device requires a constant electric field to maintain the privacy state, the device consumes additional energy beyond the typical energy needed for the monitor. When used with a battery-powered device, e.g., a laptop computer, the additional energy required to power the privacy layer will shorten the operating time of the battery. PCT Publication WO2013/048846 also describes an alternate switchable privacy film that also employs anisotropic particles that are held in an aligned position with an electric field. Similar to the '231 Application, devices of the '846 publication also require constant energy to be supplied in the privacy state.

Other active switching privacy devices have been described that rely on the movement of blocking particles within a channel as opposed to alignment of anisotropic particles. For example, US Patent Publication No. 2016/0011441 ('441 Application) describes an electrically switchable electrochromic material that is disposed in microstructured ribs running the length of a privacy layer. In the '441 Application, the absorption spectrum of the electrochromic material is changed when an electric current is supplied to the electrochromic material. While the actual switching process requires a fair amount of energy (~5 minutes of DC current), the privacy layer of the '441 Application is able to maintain its state for some time once the transformation is complete. Another alternative is described in US Patent Publication No. 2017/0097554, whereby long light control channels are formed between transparent conductive films and the channels are filled with electrophoretic members including transmissive dispersants and light-shielding particles. The electrophoretic members can be toggled between a narrow viewing field mode and a wide viewing field mode by using a set of three shaping electrodes to control the dispersion of the light-shielding particles in the air gap. Manufacture of the shaping electrodes can be technically challenging (and expensive) because of the need to create so many closely spaced, individually addressable electrodes.

SUMMARY OF INVENTION

Despite the availability of switchable privacy filters, e.g., using anisotropic particle alignment, there is still a need for inexpensive privacy films that are not power-hungry. Accordingly, this invention describes a light-collimating film that includes a plurality of elongated chambers of bistable electrophoretic fluids including light-scattering pigments. With a suitable arrangement of elongated chambers, the films can provide a 2× narrowing (or more) of viewing angle to light passing through the film. Importantly, because the light-collimating films include bistable electrophoretic fluids, the light-collimating films are stable for long periods of time in the wide or narrow states, and only require energy to change from one state to the other. Additionally, because the bistable electrophoretic fluid is partitioned into a plurality of elongated chambers, the electrophoretic materials are less susceptible to settling when the same light-collimating film is applied in different orientations with respect to gravity. Additionally, the transition speed between wide and narrow states is improved, and the overall effect is more consistent across a device when the bistable electrophoretic fluid is partitioned into many elongated chambers.

Furthermore, because the light-collimating film includes a plurality of small chambers, it is easy to cut the film to the desired shape/size after fabrication without losing large amounts of electrophoretic fluid. This allows the same equipment to be used to create both large- and small-area light-collimating films. For example, a square meter section sheet of light-collimating film or a roll of light-collimating film can be cut into chips of desirable size without significant loss of electrophoretic fluid. While some chambers will be opened during the cutting process, each chamber holds only a small amount of fluid, so the overall loss is small. In some cases, hundreds of small sheets (e.g., for mobile phones) can be cut from a single section sheet or roll. In some embodiments, the elongated chambers can be fabricated with a pre-determined pattern such that sheet cutting results in no loss of electrophoretic fluid.

Thus, in one aspect, the invention includes a switchable light-collimating film including a first light-transmissive electrode layer, a collimating layer having a thickness of at least 20 µm comprising a plurality of elongated chambers, and a second light-transmissive electrode layer, wherein the first and second light-transmissive layers are disposed on either side of the collimating layer. Each elongated chamber has an opening and a bistable electrophoretic fluid comprising pigment particles is disposed in each elongated chamber. The elongated chambers are sealed with a sealing layer that seals the bistable electrophoretic fluid within by spanning the opening of the elongated chamber. The switchable light-collimating film typically has a thickness of less than 500 µm, and the height of the elongated chambers is equal to or less than the thickness of the collimating layer. Typically, the elongated chambers are between 5 µm and 150 µm in width, and between 200 µm and 5 mm in length. For example, the elongated chambers can be between 5 µm and 50 µm in width, and between 50 µm and 5 mm in length.

The switchable light-collimating film is typically made from a polymer, for example a polymer made from acrylate monomers, urethane monomers, styrene monomers, epoxide monomers, silane monomers, thio-ene monomers, thio-yne monomers, or vinyl ether monomers. The first or second light-transmissive electrode layers may be made from indium-tin-oxide.

The bistable electrophoretic fluid typically includes polymer-functionalized pigment particles and free polymer in a non-polar solvent. Often, the pigment is functionalized with a polyacrylate, polystyrene, polynaphthalene, or polydimethylsiloxane. The free polymer may include polyisobutylene or copolymers including ethylene, propylene, or styrene monomers. The sealing layer may include a water soluble polymer or water dispersible polymer, such as naturally occurring water-soluble polymers, such as cellulose or gelatin, or synthetic polymers, such as polyacrylate, a polyvinyl alcohol, a polyethylene, a poly(vinyl) acetate, a poly(vinyl) pyrrolidone, a polyurethane, or a copolymer thereof.

In an embodiment, the elongated chambers are arranged in rows and columns when the collimating layer is viewed from above, wherein the longer dimension of the elongated chambers run along rows, and wherein the rows are separated from each other by at least three times the width of the elongated chambers. Often, the elongated chambers are arranged in rows and columns when the collimating layer is viewed from above, and the adjacent elongated chambers within the same row are separated by a gap of less than 30 µm. In some embodiments, the gaps between adjacent elongated chambers in the first row are offset horizontally from the gaps between adjacent elongated chambers in the second row. In some embodiments, the symmetry of the elongated chambers is disrupted by altering the length of the elongated chambers, the width of the elongated chambers, the pitch of the elongated chambers, or the width or placement of the gap between elongated chambers.

In another aspect, the invention includes a display having a light source, a switchable light-collimating film, an active matrix of thin film transistors, a liquid crystal layer, and a color filter array. The switchable light-collimating film includes a first light-transmissive electrode layer, a collimating layer having a thickness of at least 20 µm comprising a plurality of elongated chambers, and a second light-transmissive electrode layer, wherein the first and second light-transmissive layers are disposed on either side of the collimating layer. The elongated chambers hold a bistable electrophoretic fluid comprising pigment particles and the elongated chambers are sealed with a sealing layer that spans the opening of the elongated chamber.

In some embodiments, the light-collimating film or display additionally include a voltage source and a controller to provide a voltage impulse between the first and second light-transmissive electrode layers. In some embodiments, the display includes a prism film disposed between the light source and the switchable light-collimating film. In some embodiments, the display includes a diffusion layer between the prism film and the light source. In some embodiments, the display includes a touch screen layer.

DETAILED DESCRIPTION

Figure 1A:
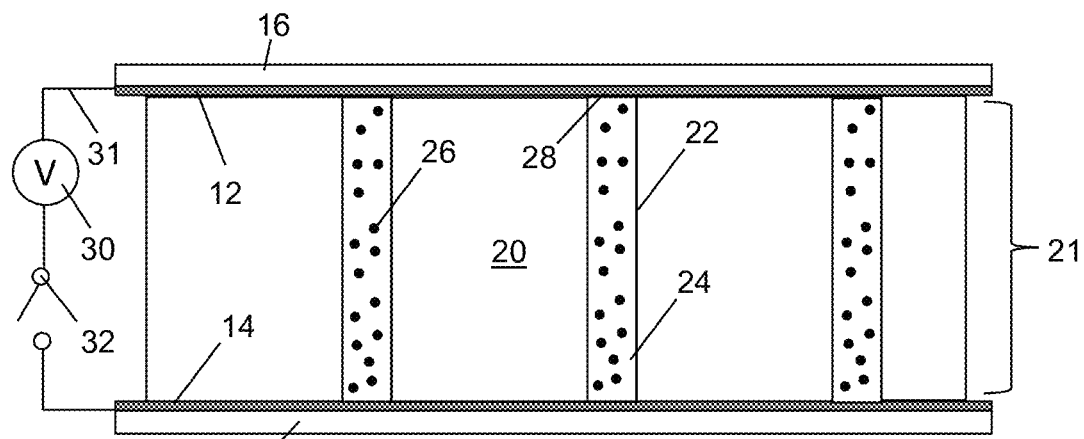
FIG. 1A illustrates a first state of a switchable light-collimating film in which electrophoretic particles are distributed throughout the chambers of a collimating layer. The electrophoretic particles are stable in this state without the application of power.

As indicated above, the present invention provides a light-collimating film that includes elongated chambers of bistable electrophoretic fluids. Such films can be used, on their own, to control the amount and/or direction of light incident to a transmissive substrate. Such films can also be integrated into devices, such as an LCD display, to provide useful features such as a zone of privacy for a user viewing the LCD display. Because the light-collimating film is switchable, it allows a user to alter the collimation of the emitted light on demand. Additionally, because the medium is bistable, the collimation state will be stable for some time, e.g., minutes, e.g., hours, e.g., days, e.g., months, without the need to provide additional energy to the light-collimating film.

The invention enables a cost effective fabrication of e a switchable light-collimating film using roll-to-roll processing. Accordingly, it is feasible to produce large sheets of switchable light-collimating film that can be incorporated into devices during other assembly processes, such as the fabrication of an LCD display. Such films may include an auxiliary optically clear adhesive layer and a release sheet, thereby allowing the light-collimating film to be shipped and distributed as a finished product. The light-collimating film may also be used for after-market light control, for example for conference room windows, exterior windows in buildings, and sunroofs and skylights.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In some embodiments, two light-transmissive electrode layers are used, thereby allowing light to pass through the electrophoretic display.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The general function of a switchable light-collimating film (10) is shown in FIGS. 1A-1F. The film (10) includes first (12) and second (14) light-transmissive electrode layers. Typically, each electrode layer is associated with a first substrate (16) and a second substrate (18), respectively. The first (16) and second (18) substrates may be a light-transmissive polymer (e.g., a film or resin) or glass. In the instance that the film (10) is produced with roll-to-roll processing, the first (16) and second (18) substrates are flexible. The light-transmissive electrodes and the substrates may also be integrated into a single layer, for example, a PET-ITO film, PEDOT, or another light-transmissive polymer that is doped with a conductive material (e.g., graphene, nanotubes, metal flakes, conductive metal oxide particles, or metal fibers) and/or doped with conductive monomers or polymers and/or doped with ionic materials, such as salts.

The light-collimating layer (21) comprises a light-transmissive polymer (20) that has been processed to produce a plurality of elongated chambers (22) to hold a bistable electrophoretic fluid (24) that includes electrophoretic particles (26). In an embodiment, the bistable electrophoretic fluid (24) includes a hydrocarbon solvent and the electrophoretic particles (26) comprise carbon black (optionally functionalized as discussed below). The light-collimating layer is at least 20 µm thick (i.e., the distance between the first (12) and second (14) light-transmissive electrode layers). The light-collimating layer can be thicker than 20 µm, for example thicker than 30 µm, for example thicker than 50 µm, for example thicker than 70 µm, for example thicker than 100 µm, for example thicker than 150 µm, for example thicker than 200 µm. The fabrication of the elongated chambers, e.g., by embossing a thermoplastic, is described in greater detail below. After, or during the process of filing the elongated chambers (22), the elongated chambers (22) are sealed with a sealing layer (28), which may be, for example, a hydrophilic polymer that is incompatible with the bistable electrophoretic fluid (24).

In order to change the collimating properties of the film (10) the first (12) and second (14) light-transmissive electrode layers may be coupled to a source (30) of an electrical potential. The source may be, e.g., a battery, a power supply, a photovoltaic, or some other source of electrical potential. The source may provide a simple D.C. potential, or it may be configured to provide time-varying voltages, e.g., "waveforms" as described below. The first (12) and second (14) light-transmissive electrode layers may be coupled to the source (30) via electrodes, wires, or traces (31). In some embodiments, the traces (31) may be interrupted with a switch (32) which may be, e.g., a transistor switch. The electrical potential between the first (12) and second (14) light-transmissive electrode layers is typically at least one volt, for example at least two volts, for example at least five volts, for example at least ten volts, for example at least 15 volts, for example at least 18 volts, for example at least 25 volts, for example at least 30 volts, for example at least 30 volts, for example at least 50 volts.

Figure 1B:
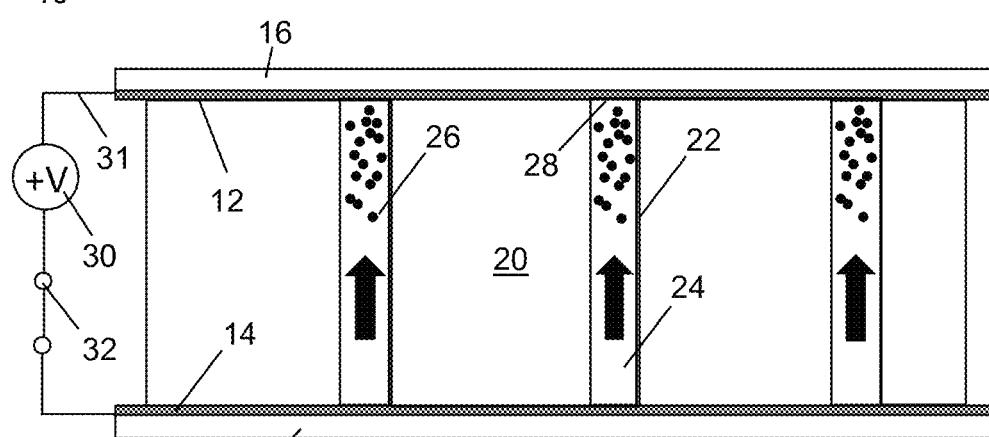
FIG. 1B illustrates a second state of a switchable light-collimating film in which electrophoretic particles are driven toward a first light-transmissive electrode with the application of an electrical potential.
Figure 1C:
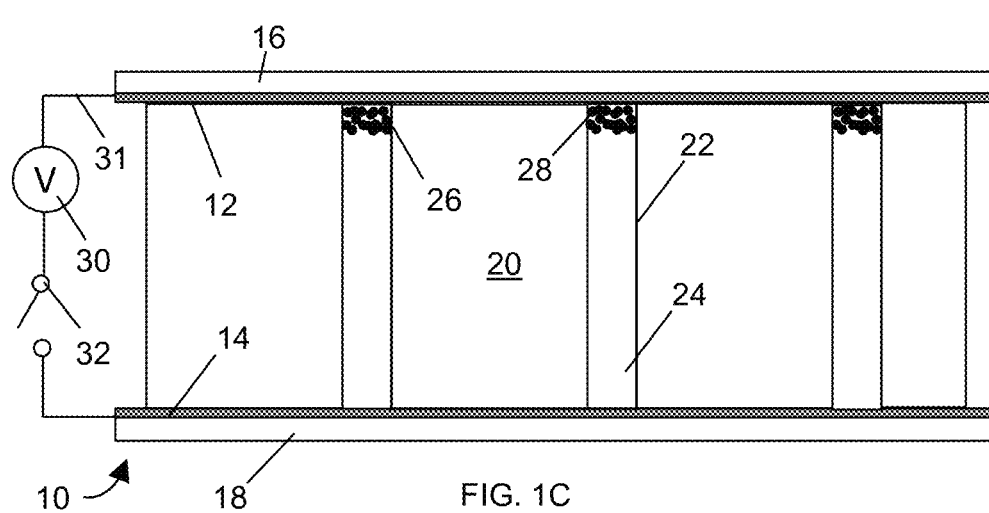
FIG. 1C illustrates a third state of a switchable light-collimating film in which electrophoretic particles are collected in proximity to the first light-transmissive electrode. The particles are stable in this position even after the electric potential has been removed.

Because the bistable electrophoretic fluid (24) is bistable, the electrophoretic particles (26) will maintain their distribution without application of an electric field. This feature is well described in E Ink Corporation patents listed herein, but mostly results from having a specific mixture of distributed polymers (e.g., polyisobutylene or polylaurylmethacrylate) in the bistable electrophoretic fluid (24) so that the electrophoretic particles (26) are stabilized via depletion flocculation. Accordingly, in a first state, illustrated in FIG. 1A, the electrophoretic particles (26) are stable in a dispersed state, despite no electrical potential being applied between the first (12) and second (14) light-transmissive electrode layers. With the application of a suitable electric potential, e.g., as illustrated in FIG. 1B, the electrophoretic particles (26) move toward the suitably biased electrode layer, creating a light-transmission gradient along the height of the elongated chambers (22). Once the electrophoretic particles (26) are driven to the desired electrode layer, the source (30) can be decoupled from the electrode layers, turning off the electric potential. However, because of the bistability of the bistable electrophoretic fluid (24), the electrophoretic particles (26) will remain in the second state of a long period of time, e.g., minutes, e.g., hours, e.g., days, as shown in FIG. 1C.

Figure 1D:
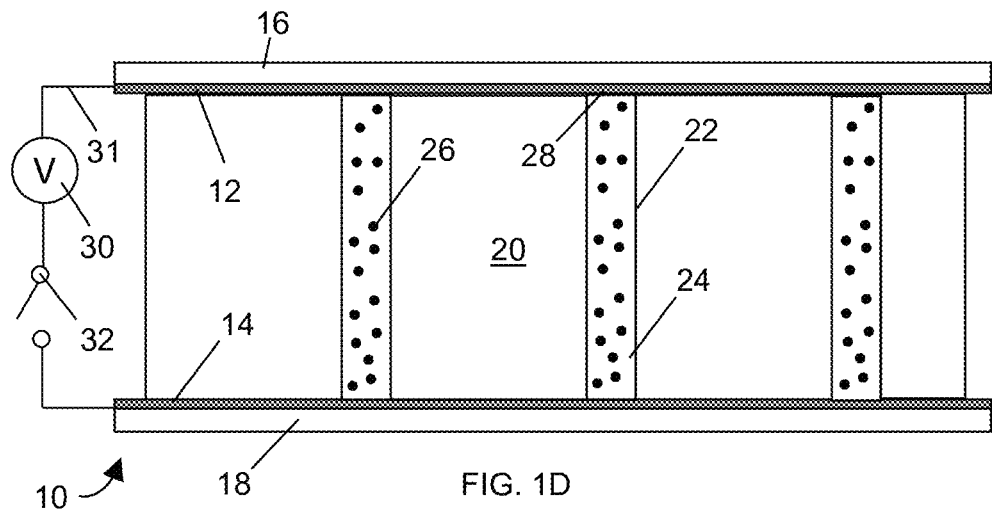
FIG. 1D illustrates a return to a state in which the electrophoretic particles are distributed throughout the chambers of a collimating layer.
Figure 1E:
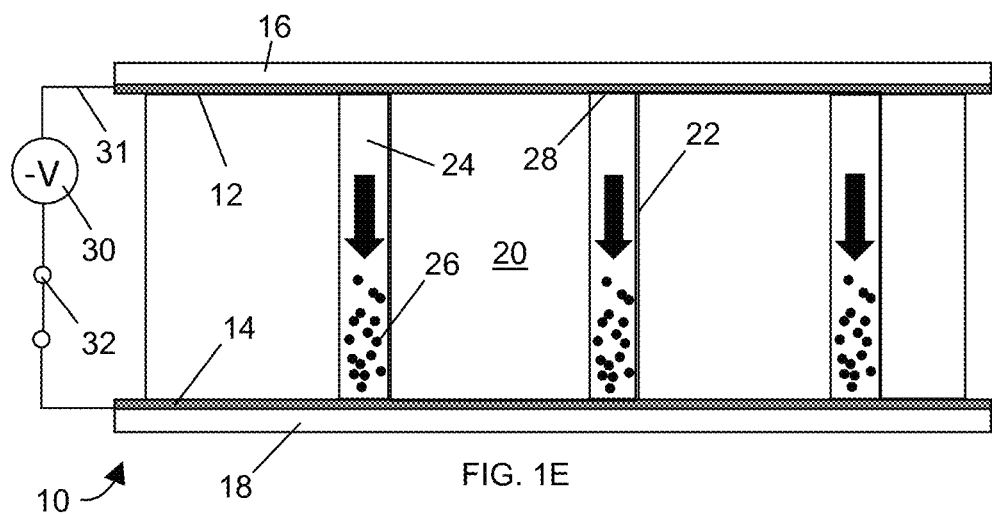
FIG. 1E illustrates a fourth state of a switchable light-collimating film in which electrophoretic particles are driven toward a second light-transmissive electrode with the application of an electrical potential having an opposite polarity of FIG. 1B.
Figure 1F:
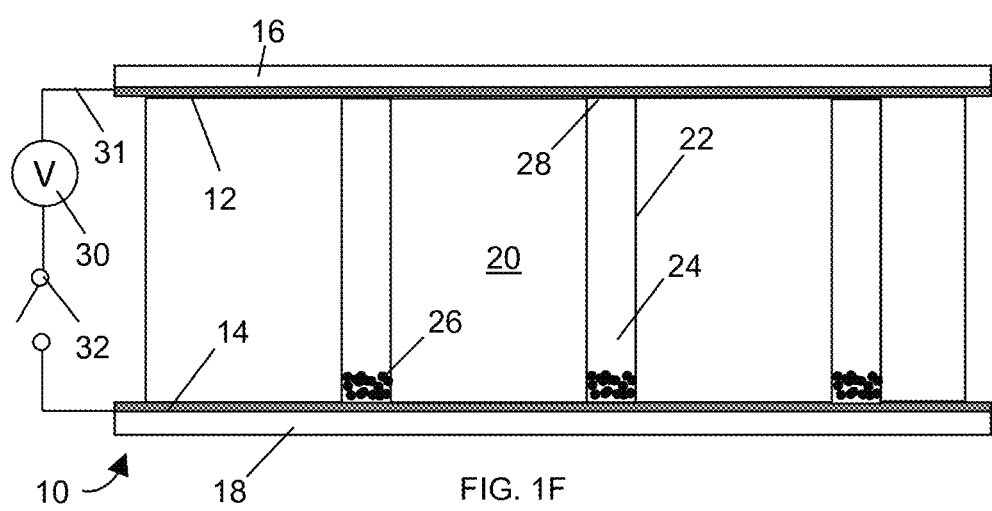
FIG. 1F illustrates a fifth state of a switchable light-collimating film in which electrophoretic particles are collected in proximity to the second light-transmissive electrode. The particles are stable in this position even after the electric potential has been removed.

The state of the light-collimating film (10) can be reversed by driving the collected electrophoretic particles (26) away from the electrode with a reverse polarity voltage (not shown) to achieve FIG. 1D. Upon returning to the initial state (equivalent to 1 A), only (roughly) collimated light will be able to pass the light-collimating film, as described in greater detail below. The state of FIG. 1D is also stable. The electrophoretic particles (26) can be driven past this distributed state and toward the second light-transmissive electrode (14) with application of the reverse-polarity voltage from FIG. 1B, as shown in FIG. 1E. As a result, the electrophoretic particles (26) will collect adjacent the second light-transmissive electrode (14) which also results in a wide-viewing angle, as discussed below. The wide-angle transmissive state shown in FIG. 1F is also bistable, that is, no power is required to maintain this state. Because the states of FIG. 1C and FIG. 1F both result in wide-angle transmission, it is possible to toggle between the states shown in FIGS. 1A, 1C, 1D, and 1F while maintaining an overall DC balance on the drive electronics. DC balancing the drive electronics reduces charge build-up and extends the life of the system components.

The internal phase of the electrophoretic medium includes charged pigment particles in a suspending fluid. The fluids used in the variable transmission media of the present invention will typically be of low dielectric constant (preferably less than 10 and desirably less than 3). Especially preferred solvents include aliphatic hydrocarbons such as heptane, octane, and petroleum distillates such as Isopar® (Exxon Mobil) or Isane® (Total); terpenes such as limonene, e.g., 1-limonene; and aromatic hydrocarbons such as toluene. A particularly preferred solvent is limonene, since it combines a low dielectric constant (2.3) with a relatively high refractive index (1.47). The index of refraction of the internal phase may be modified with the addition of index matching agents such as Cargille® index matching fluids available from Cargille-Sacher Laboratories Inc. (Cedar Grove, N.J.). In encapsulated media of the present invention, it is preferred that the refractive index of the dispersion of particles match as closely as possible that of the encapsulating material to reduce haze. This index matching is best achieved (when employing commonly available polymeric encapsulants) when the refractive index of the solvent is close to that of the encapsulant. In most instances, it is beneficial to have an internal phase with an index of refraction between 1.51 and 1.57 at 550 nm, preferably about 1.54 at 550 nm.

Charged pigment particles may be of a variety of colors and compositions. Additionally, the charged pigment particles may be functionalized with surface polymers to improve state stability. Such pigments are described in U.S. Patent Publication No. 2016/0085132, which is incorporated by reference in its entirety. For example, if the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color, or composite particles engineered to have a desired index of refraction. Black charged particles, they may be formed from CI pigment black 26 or 28 or the like (e.g., manganese ferrite black spinel or copper chromite black spinel) or carbon black. Other colors (non-white and non-black) may be formed from organic pigments such as CI pigment PR 254, PR122, PR149, PG36, PG58, PG7, PB28, PB15:3, PY83, PY138, PY150, PY155 or PY20. Other examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like. The surface of the charged particles may be modified by known techniques based on the charge polarity and charge level of the particles required, as described in U.S. Pat. Nos. 6,822,782, 7,002, 728, 9,366,935, and 9,372,380 as well as US Publication No. 2014-0011913, the contents of all of which are incorporated herein by reference in their entirety.

The particles may exhibit a native charge, or they may be charged explicitly using a charge control agent, or may acquire a charge when suspended in a solvent or solvent mixture. Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly (ethylene co-butylene) derivatives, and the like. In addition to the suspending fluid and charged pigment particles, internal phases may include stabilizers, surfactants and charge control agents. A stabilizing material may be adsorbed on the charged pigment particles when they are dispersed in the solvent. This stabilizing material keeps the particles separated from one another so that the variable transmission medium is substantially non-transmissive when the particles are in their dispersed state. As is known in the art, dispersing charged particles (typically a carbon black, as described above) in a solvent of low dielectric constant may be assisted by the use of a surfactant. Such a surfactant typically comprises a polar "head group" and a non-polar "tail group" that is compatible with or soluble in the solvent. In the present invention, it is preferred that the non-polar tail group be a saturated or unsaturated hydrocarbon moiety, or another group that is soluble in hydrocarbon solvents, such as for example a poly(dialkylsiloxane). The polar group may be any polar organic functionality, including ionic materials such as ammonium, sulfonate or phosphonate salts, or acidic or basic groups. Particularly preferred head groups are carboxylic acid or carboxylate groups. Stabilizers suitable for use with the invention include polyisobutylene and polystyrene. In some embodiments, dispersants, such as polyisobutylene succinimide and/or sorbitan trioleate, and/or 2-hexyldecanoic acid are added.

The electrophoretic media of the present invention will typically contain a charge control agent (CCA), and may contain a charge director. These electrophoretic media components typically comprise low molecular weight surfactants, polymeric agents, or blends of one or more components and serve to stabilize or otherwise modify the sign and/or magnitude of the charge on the electrophoretic particles. The CCA is typically a molecule comprising ionic or other polar groupings, hereinafter referred to as head groups. At least one of the positive or negative ionic head groups is preferably attached to a non-polar chain (typically a hydrocarbon chain) that is hereinafter referred to as a tail group. It is thought that the CCA forms reverse micelles in the internal phase and that it is a small population of charged reverse micelles that leads to electrical conductivity in the very non-polar fluids typically used as electrophoretic fluids.

Reverse micelles comprise a highly polar core (that typically contains water) that may vary in size from 1 nm to tens of nanometers (and may have spherical, cylindrical, or other geometry) surrounded by the non-polar tail groups of the CCA molecule. Reverse micelles have been extensively studied, especially in ternary mixtures such as oil/water/surfactant mixtures. An example is the iso-octane/water/AOT mixture described, for example, in Fayer et al., J. Chem. Phys., 131, 14704 (2009). In electrophoretic media, three phases may typically be distinguished: a solid particle having a surface, a highly polar phase that is distributed in the form of extremely small droplets (reverse micelles), and a continuous phase that comprises the fluid. Both the charged particles and the charged reverse micelles may move through the fluid upon application of an electric field, and thus there are two parallel pathways for electrical conduction through the fluid (which typically has a vanishingly small electrical conductivity itself).

The polar core of the CCA is thought to affect the charge on surfaces by adsorption onto the surfaces. In an electrophoretic display, such adsorption may be onto the surfaces of the electrophoretic particles or the interior walls of a microcapsule (or other solid phase, such as the walls of a microcell) to form structures similar to reverse micelles, these structures hereinafter being referred to as hemi-micelles. When one ion of an ion pair is attached more strongly to the surface than the other (for example, by covalent bonding), ion exchange between hemi-micelles and unbound reverse micelles can lead to charge separation in which the more strongly bound ion remains associated with the particle and the less strongly bound ion becomes incorporated into the core of a free reverse micelle.

It is also possible that the ionic materials forming the head group of the CCA may induce ion-pair formation at the electrophoretic particle (or other) surface. Thus, the CCA may perform two basic functions: charge-generation at the surface and charge-separation from the surface. The charge generation may result from an acid-base or an ion exchange reaction between some moieties that are present in the CCA molecule or otherwise incorporated into the reverse micelle core or fluid, and the particle surface. Thus, useful CCA materials are those, which are capable of participating in such a reaction, or any other charging reaction as known in the art. The CCA molecules may additionally act as receptors of the photo-excitons produced by the electrophoretic particles when the particles are irradiated with light.

Non-limiting classes of charge control agents that are useful in the media of the present invention include organic sulfates or sulfonates, metal soaps, block or comb copolymers, organic amides, organic zwitterions, and organic phosphates and phosphonates. Useful organic sulfates and sulfonates include, but are not limited to, sodium bis(2-ethylhexyl) sulfosuccinate, calcium dodecylbenzenesulfonate, calcium petroleum sulfonate, neutral or basic barium dinonylnaphthalene sulfonate, neutral or basic calcium dinonylnaphthalene sulfonate, dodecylbenzenesulfonic acid sodium salt, and ammonium lauryl sulfate. Useful metal soaps include, but are not limited to, basic or neutral barium petronate, calcium petronate, cobalt, calcium, copper, manganese, magnesium, nickel, zinc, aluminum and iron salts of carboxylic acids such as naphthenic, octanoic, oleic, palmitic, stearic, and myristic acids and the like. Useful block or comb copolymers include, but are not limited to, AB diblock copolymers of (A) polymers of 2-(N,N-dimethylamino)ethyl methacrylate quaternized with methyl p-toluenesulfonate and (B) poly(2-ethylhexyl methacrylate), and comb graft copolymers with oil soluble tails of poly(12-hydroxystearic acid) and having a molecular weight of about 1800, pendant on an oil-soluble anchor group of poly(methyl methacrylate-methacrylic acid). Useful organic amides/amines include, but are not limited to, polyisobutylene succinimides such as OLOA 371 or 1200 (available from Chevron Oronite Company LLC, Houston, Tex.), or Solsperse 17000 (available from Lubrizol, Wickliffe, Ohio: Solsperse is a Registered Trade Mark), and N-vinylpyrrolidone polymers. Useful organic zwitterions include, but are not limited to, lecithin. Useful organic phosphates and phosphonates include, but are not limited to, the sodium salts of phosphated mono- and di-glycerides with saturated and unsaturated acid substituents. Useful tail groups for CCA include polymers of olefins such as poly (isobutylene) of molecular weight in the range of 200-10,000. The head groups may be sulfonic, phosphoric or carboxylic acids or amides, or alternatively amino groups such as primary, secondary, tertiary or quaternary ammonium groups.

Charge adjuvants used in the media of the present invention may bias the charge on electrophoretic particle surfaces, as described in more detail below. Such charge adjuvants may be Bronsted or Lewis acids or bases.

Particle dispersion stabilizers may be added to prevent particle flocculation or attachment to the capsule or other walls or surfaces. For the typical high resistivity liquids used as fluids in electrophoretic displays, non-aqueous surfactants may be used. These include, but are not limited to, glycol ethers, acetylenic glycols, alkanolamides, sorbitol derivatives, alkyl amines, quaternary amines, imidazolines, dialkyl oxides, and sulfosuccinates.

As described in U.S. Pat. No. 7,170,670, the bistability of electrophoretic media can be improved by including in the fluid a polymer having a number average molecular weight in excess of about 20,000, this polymer being essentially non-absorbing on the electrophoretic particles; poly (isobutylene) is a preferred polymer for this purpose.

In addition, as described in for example, U.S. Pat. No. 6,693,620, a particle with immobilized charge on its surface sets up an electrical double layer of opposite charge in a surrounding fluid. Ionic head groups of the CCA may be ion-paired with charged groups on the electrophoretic particle surface, forming a layer of immobilized or partially immobilized charged species. Outside this layer there is a diffuse layer comprising charged (reverse) micelles comprising CCA molecules in the fluid. In conventional DC electrophoresis, an applied electric field exerts a force on the fixed surface charges and an opposite force on the mobile counter-charges, such that slippage occurs within the diffuse layer and the particle moves relative to the fluid. The electric potential at the slip plane is known as the zeta potential.

Figure 2A:
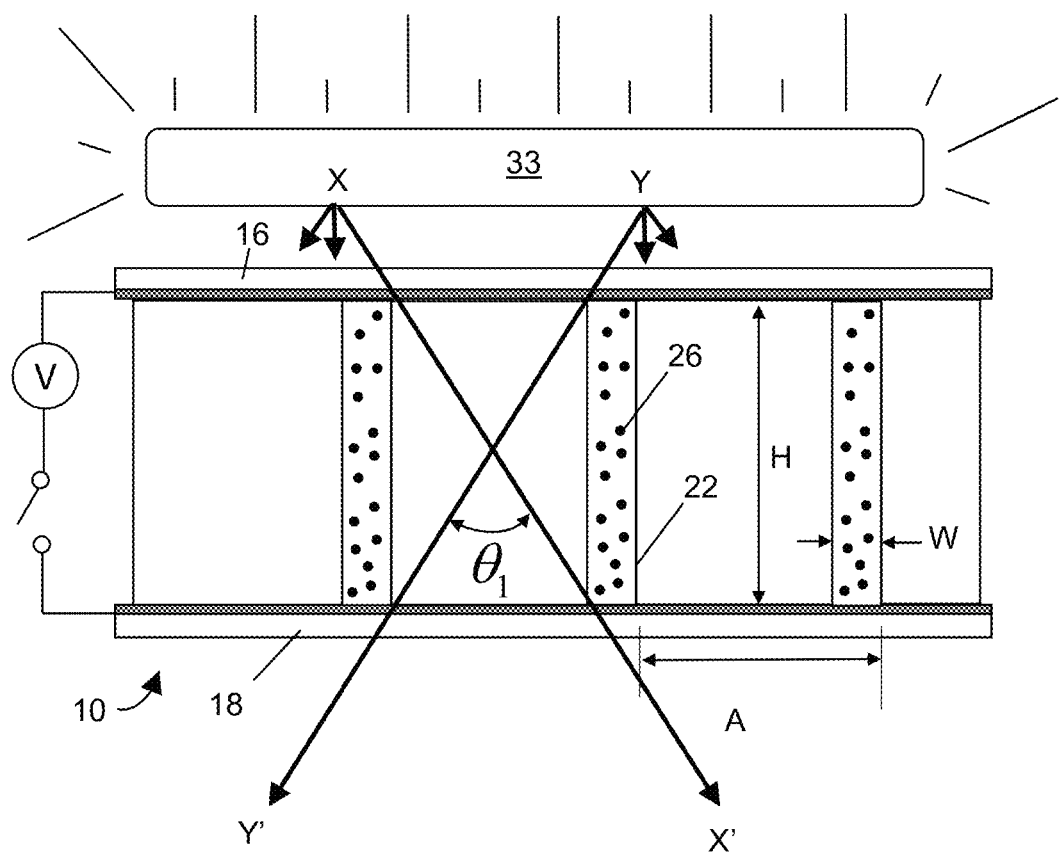
FIG. 2A illustrates that when electrophoretic particles are distributed throughout chambers of a collimating layer, rays of light emitted from a source are limited to an angle $\theta_1$.
Figure 2B:
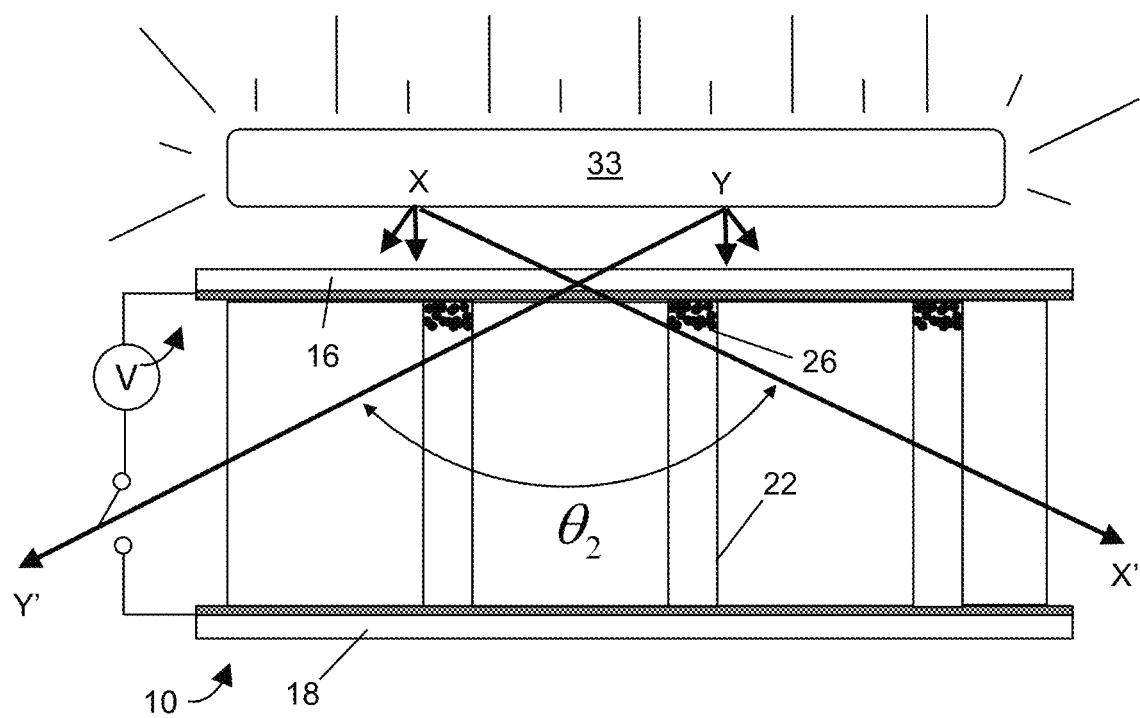
FIG. 2B illustrates that when electrophoretic particles are collected against a light-transmissive electrode closest to the light source, rays of light emitted from the source at an angle $\theta_2$, wherein $\theta_2 >> \theta_1$.
Figure 2C:
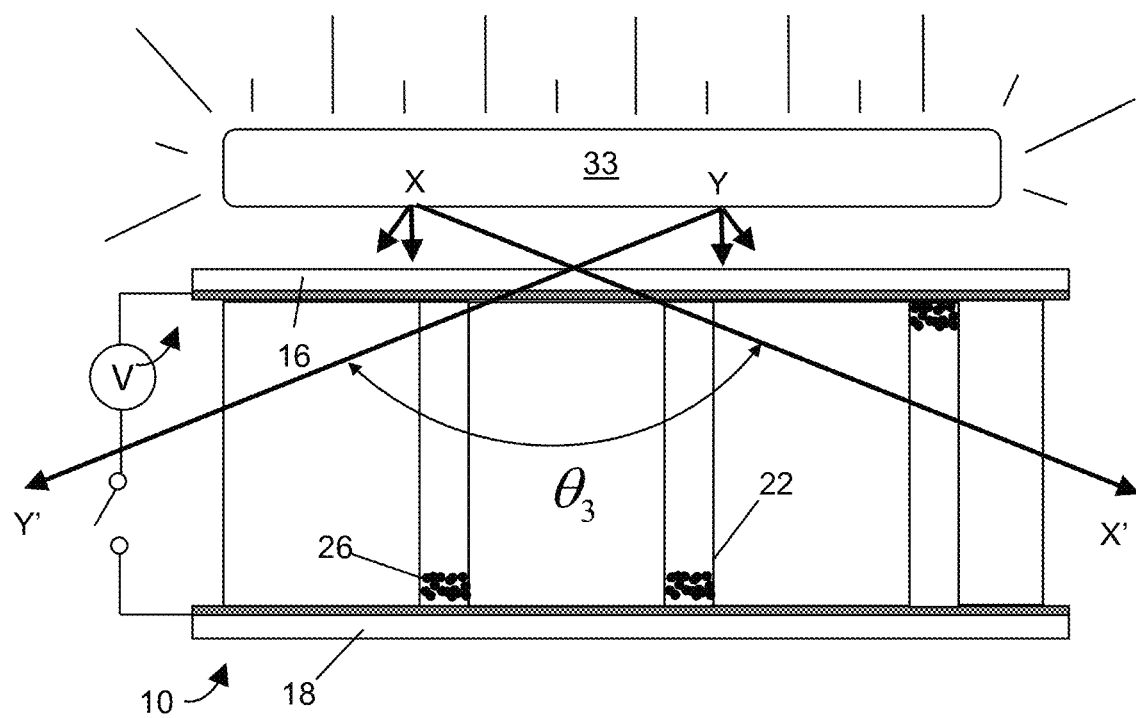
FIG. 2C illustrates that when electrophoretic particles are collected against a light-transmissive electrode furthest from the light source, rays of light emitted from the source at an angle $\theta_3$, wherein $\theta_3 >> \theta_1$. It is observed that there is minimal light loss due to the presence of the pigment particles at the emissive side of the light-collimating film.

The resulting light-collimating film (10) can be used to narrow (collimate) light (33) as shown in FIGS. 2A, 2B, and 2C. In a first, narrowed state, shown in FIG. 2A, the electrophoretic particles (26) are distributed throughout the elongated chambers (22) resulting in transmission angle $\theta_1$ that is defined by the pitch (A) between elongated chambers (22), the width (W) of each elongated chamber (22), the height (H) of the light-collimating film (10), and the distance from the source of the light (33) to the exiting substrate (in the example of FIG. 2A, substrate (18)). As can be seen in FIG. 2A, the angle $\theta_1$ is roughly defined by the rays X-X' and Y-Y', which define the greatest angle from normal that light can leave the source (33) and clear both the top and the bottom of the elongated chamber (22) with electrophoretic particles (26) distributed throughout.

In a first wide-angle state, equivalent to FIG. 1C above, the electrophoretic particles (26) are driven to the nearer substrate (16), and a new transmission angle $\theta_2$ is established for the rays X-X' and Y-Y', as shown in FIG. 2B. The new transmission angle $\theta_2$ will be much wider than $\theta_1$, as shown in FIG. 2B, that is, $\theta_2 \gg \theta_1$. Again, the effective narrowing of the transmission angle $\theta_2$ will be a function of the pitch (A) between elongated chambers (22), the width (W) of each elongated chamber (22), and the height (H) of the light-collimating film (10).

In a second wide-angle state, equivalent to FIG. 1F above, the electrophoretic particles (26) are driven to the substrate (16) away from the light source (33), and a new transmission angle $\theta_3$ is established for the rays X-X' and Y-Y', as shown in FIG. 2C. The new transmission angle $\theta_3$ will be much wider than $\theta_1$, as shown in FIG. 2C, that is, $\theta_3 \gg \theta_1$. Like FIG. 2B, the effective narrowing of the transmission angle $\theta_3$ will be a function of the pitch (A) between elongated chambers (22), the width (W) of each elongated chamber (22), and the height (H) of the light-collimating film (10). Furthermore, while it would seem that a shadow may be cast by the electrophoretic particles (26) accumulated adjacent to the second substrate (18), this is not observed. It is surmised that there is sufficient scattered light through the light-collimating film (10) to wash out this effect.

It is expected that in most configurations, light-collimating films (10) of the invention will provide at least a two-fold reduction in effective viewing area (as defined by less than 50% percent relative transmission as a function of angle from the normal) in transitioning from wide-transmission angle (FIGS. 2B and 2C) to narrow-transmission angle (FIG. 2A). In some embodiments, the reduction in viewing area will be greater than two-fold, e.g., three-fold, e.g., four-fold. Because of this functionality, light-collimating film (10) may be useful when simply applied to a pane of glass, e.g., an interior office window, whereby the transmission angle of the glass can be greatly reduced, thereby increasing privacy for the occupants of the office while still allowing a good amount of light to transit through the window.

Figure 3:
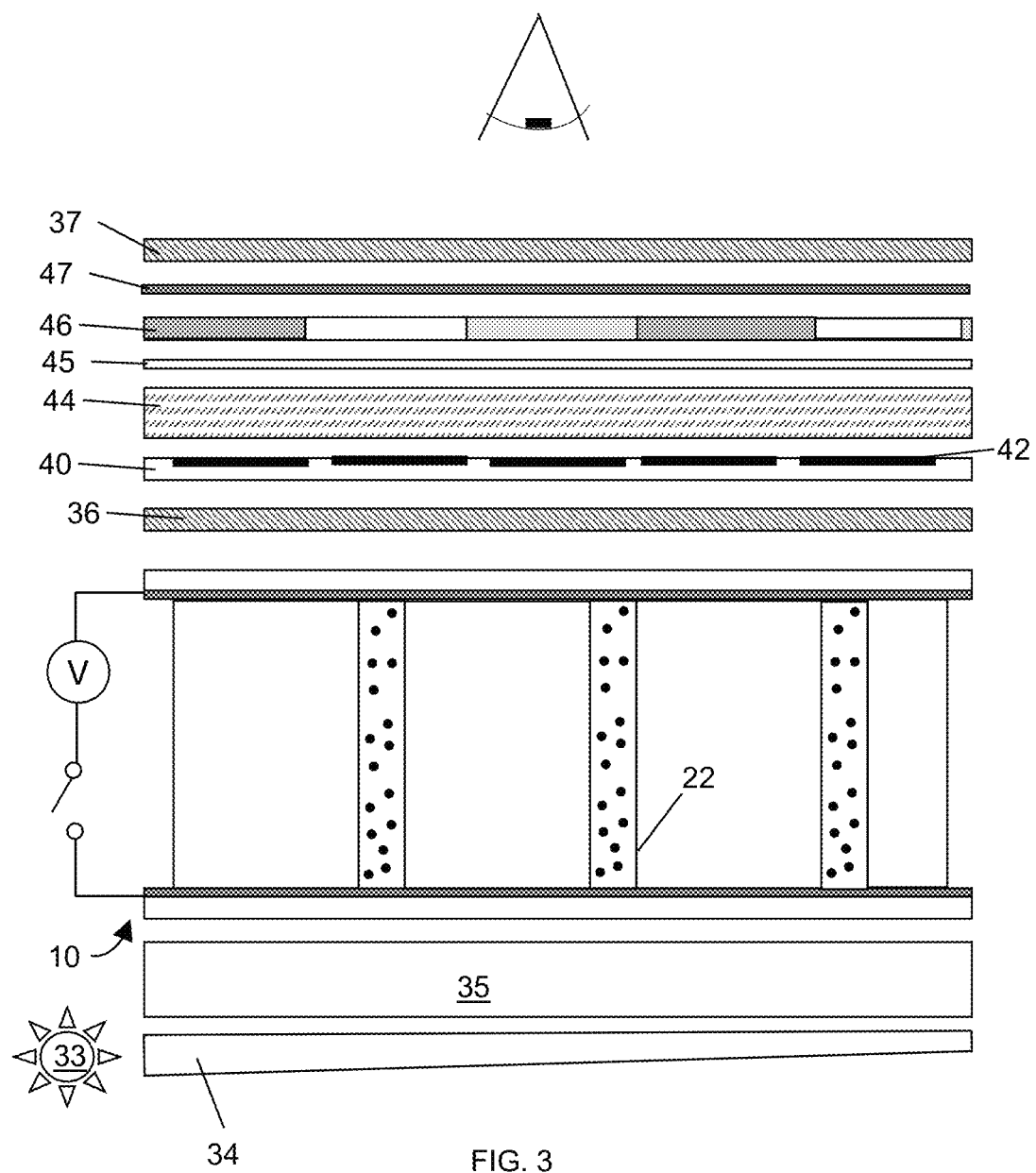
FIG. 3 illustrates the operative layers of a liquid crystal display assembly including a switchable light-collimating film. The layers are not to scale.
Figure 4:
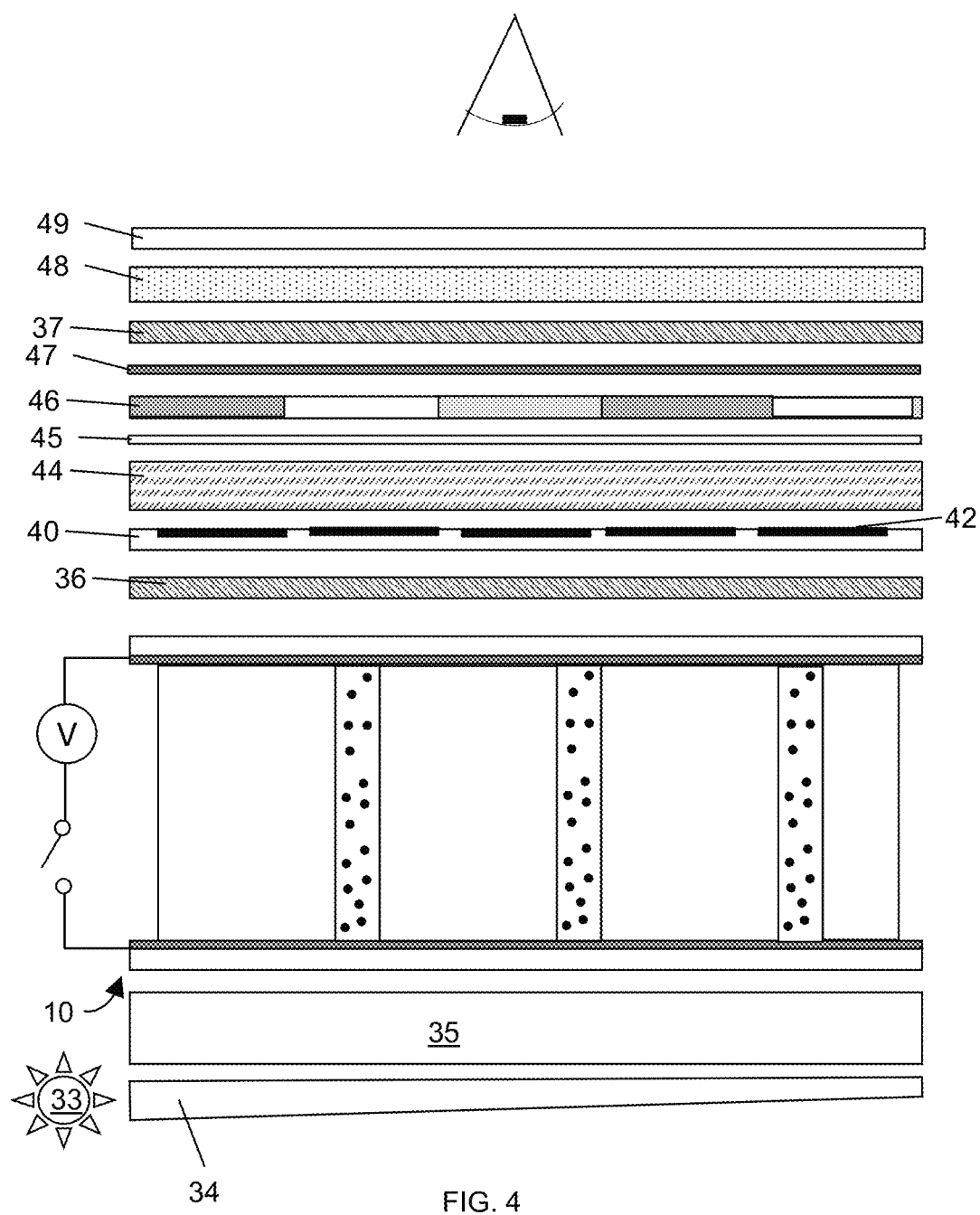
FIG. 4 illustrates the operative layers of a liquid crystal display assembly including a switchable light-collimating film and a touch screen. The layers are not to scale.

A light-collimating film (10) may be incorporated into a liquid crystal display (LCD) stack as shown in FIG. 3. FIG. 3 is exemplary, as there are a number of different configurations for LCD stacks. As shown in FIG. 3 a light (33), which is typically one or more light-emitting diodes (LEDs), is directed through the display stack, including the active layer, by a combination of a light-guide plate (34) and a diffuser plate (35). The light that leaves the diffuser plate (35), travelling in the direction of the viewer (eye at top of FIG. 3), next encounters a light-collimating film (10), of the type described above. In the state shown in FIG. 3, the light-collimating film (10) will only allow light to pass to the active layer when that light is travelling within a narrower transmission angle (see FIG. 2). The light that does pass through the light-collimating film (10) will next proceed through a first polarizing film (36), an active matrix thin film transistor (AM-TFT) array (40) including a plurality of pixel electrodes (42). The polarized light passing through the AM-TFT (40) and pixel electrodes (42) will then encounter a liquid crystal layer (44), whereby the polarization of the light can be manipulated by the liquid crystals such that the light will be transmitted through as second polarizing film (37) or rejected. Specifically, the optical state of the liquid crystal layer (44) is altered by providing an electric field between a pixel electrode and the front electrode (45), as is known in the art of LCD displays. The light that is transmitted through the light-collimating film (10), AM-TFT (40), pixel electrodes (42), liquid crystal layer (44), and front electrode (45) will then transmit through a color filter array (46) which will only pass the spectrum of color that is to be associated with the underlying pixel electrode (42). Finally, some amount of light that is of the correct color and the correct polarization (as determined by the liquid crystal layer) will traverse the second polarizing film (37) and be viewed by the viewer. Various additional layers of optical adhesives (47) may be included in the stack where needed. The stack may also include a protective cover layer (49) which may be, e.g., glass or plastic. Additional elements, such as a capacitive touch-sensitive layer (48) or a digitizer layer (not shown) may also be added to the stack to achieve touch screen capability or writing capability, etc. FIG. 4 illustrates the inclusion of a protective cover layer (49) and a capacitive touch-sensitive layer (48).

The net effect of the LCD stack including a light-collimating film (10) illustrated in FIG. 3 is that it is possible to independently control the transmission angle of light emanating from an LCD display, e.g., a computer monitor, smart phone, data terminal, or other LCD display. Furthermore, because the switching medium is bistable, the device can remain in a "wide" or "narrow" state virtually indefinitely. In advanced embodiments, the amount of narrowing can be adjusted by controlling the relative amount of pigment that is driven toward the viewing side of the elongated chambers. The transmission angle can be adjusted completely independent of the state of the LCD. That is, it is not necessary to power down the monitor to switch between a privacy and non-privacy mode.

Figure 5:
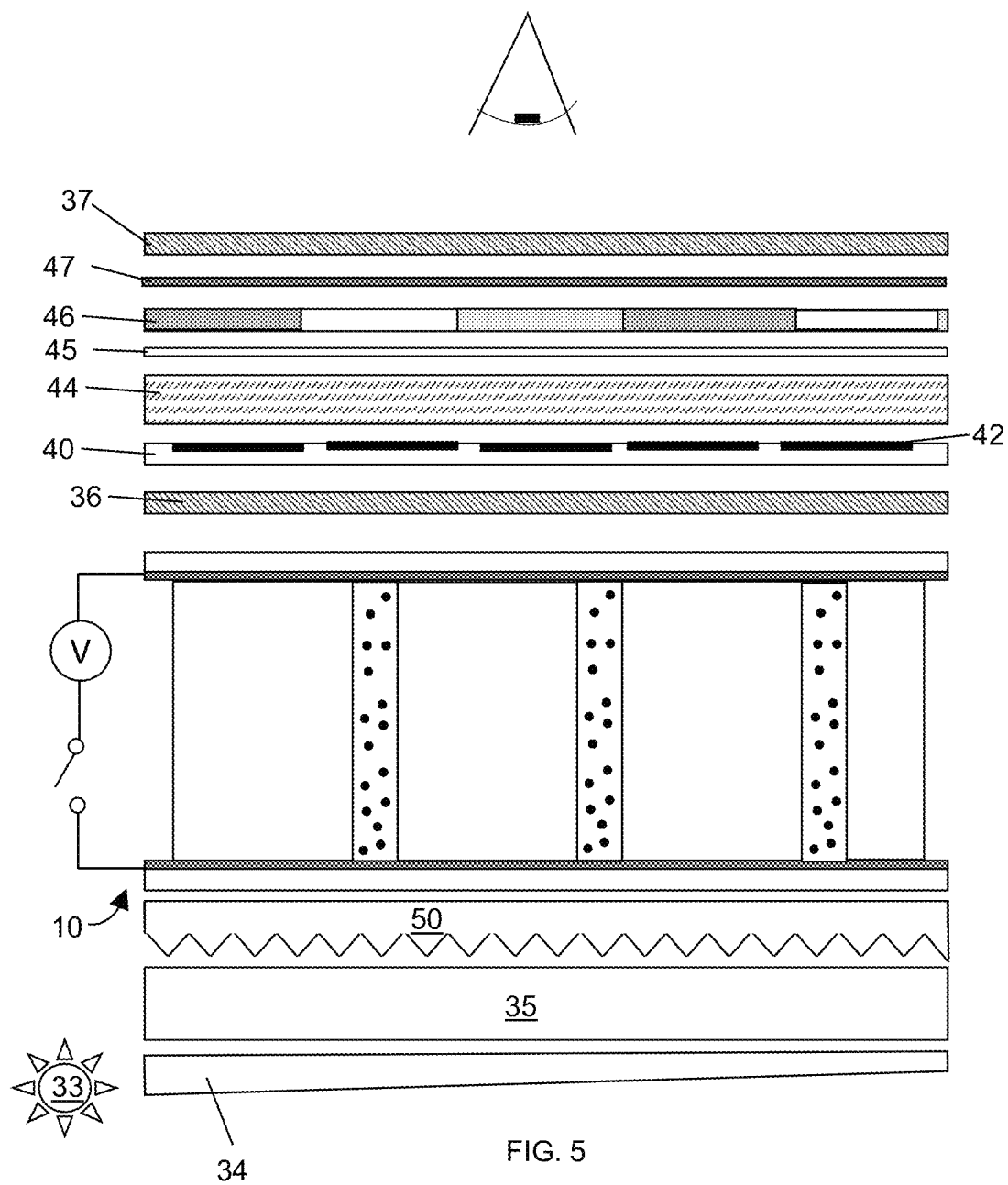
FIG. 5 illustrates the operative layers of a liquid crystal display assembly including a switchable light-collimating film and a prism film. The layers are not to scale.

In other embodiments, an additional prism film (50) may be added to the stack of optical elements, as shown in FIG. 5, in order to increase the amount of incident light that is directed toward the light-collimating film (10) with the correct orientation to pass through the light-collimating film (10). Incorporating a prism film (50) will result in the intensity of the display having a slight angular dependence, however the overall efficiency of the display stack is improved and results in less power consumption. This feature may be especially desirous in e.g., a mobile device, such as a laptop or phone.

Figure 6:
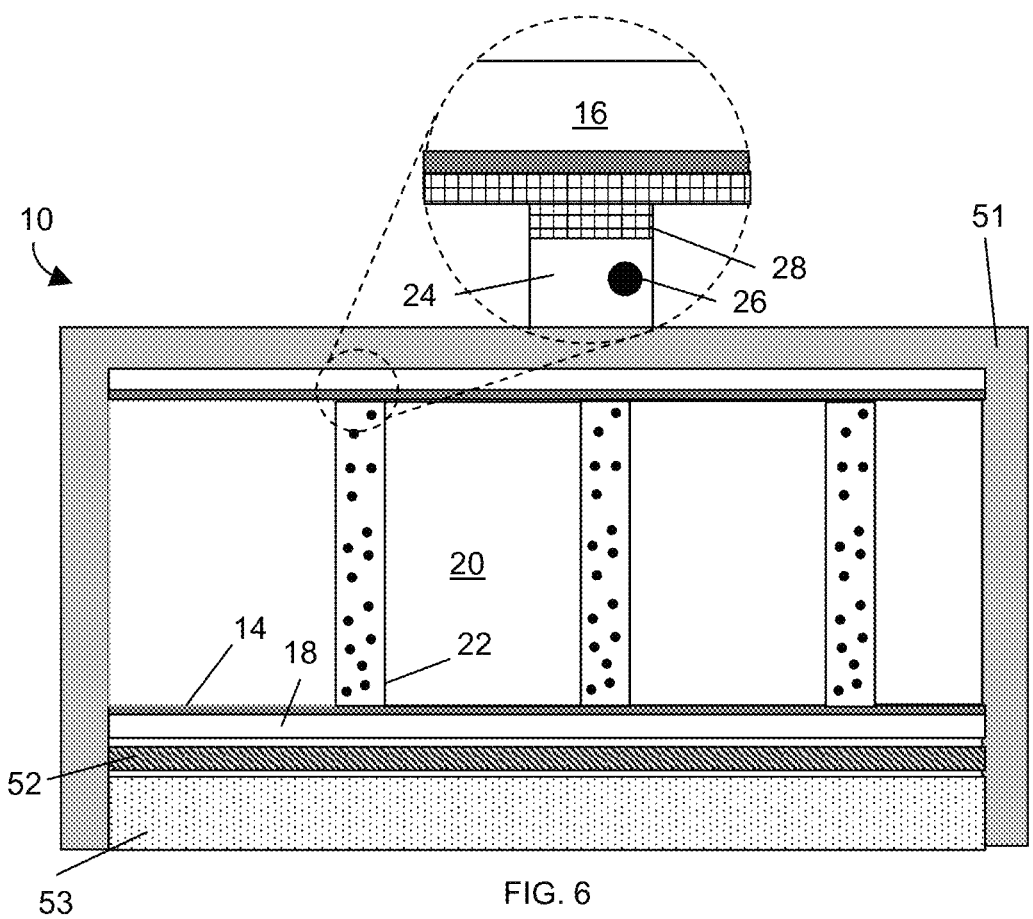
FIG. 6 illustrates an embodiment of a switchable light-collimating film disposed on a lower substrate. The switchable light-collimating film additionally includes an edge seal. The exploded view details the sealing layer atop the elongated chamber filled with bistable electrophoretic fluid.

An exploded view of the sealing layer (28) is shown in FIG. 6. In some embodiments, the sealing layer (28) seals a top portion of the elongated chamber (22) as shown in the exploded view in order to hold the bistable electrophoretic fluid (24). This may be achieved by under-filling the elongated chamber (22) with bistable electrophoretic fluid (24) and then overcoating the most full elongated chambers (22) with the sealing formulation (discussed below). In other embodiments, the sealing composition may be dispersed in the bistable electrophoretic fluid (24) at the time of filling, but designed with the correct hydrophilicity and density to cause the sealing formulation to rise to the top of the elongated chamber (22) whereby it is hardened, e.g., using light, heat, or exposure to an activating chemical agent. In alternative embodiments (not shown in FIG. 6) the elongated chambers (22) may be filled to the top and the sealing layer spread over the entirety of the top of the light-transmissive polymer (20), thereby sealing the bistable electrophoretic fluid (24) within the elongated chambers.

Examples of essential components in a sealing composition for the sealing layer may include, but are not limited to, thermoplastic or thermoset and their precursor thereof. Specific examples may include materials such as monofunctional acrylates, monofunctional methacrylates, multifunctional acrylates, multifunctional methacrylates, polyvinyl alcohol, polyacrylic acid, cellulose, gelatin or the like. Additives such as a polymeric binder or thickener, photoinitiator, catalyst, vulcanizer, filler, colorant or surfactant may be added to the sealing composition to improve the physicomechanical properties and the light-collimating film.

The sealing composition may be a water soluble polymer with water as the sealing solvent. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrrolidone) and its copolymers such as poly(vinylpyrrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly(methacrylic acid), its salt forms, and its copolymers; poly(maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2- methacryloxyethyltrimethylammonium bromide), poly(allylamine hydrochloride). The sealing material may also include a water dispersible polymer with water as a formulating solvent. Examples of suitable polymer water dispersions may include polyurethane water dispersion and latex water dispersion. Suitable latexes in the water dispersion include polyacrylate, polyvinyl acetate and its copolymers such as ethylene vinyl acetate, and polystyrene copolymers such as polystyrene butadiene and polystyrene/acrylate.

Examples of additional components which may be present, for example in an adhesive composition may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Adhesive layers may also contain polyurethane dispersions and water soluble polymer selected from the group consisting of polyvinyl alcohol; polyethylene glycol and its copolymers with polypropylene glycol; poly(vinylpyrolidone) and its copolymers; polysaccharides; gelatin; poly(acrylic acid), its salt forms, and its copolymers; poly(methacrylic acid), its salt forms, and its copolymers; poly(2-dimethylaminoethyl methacrylate); poly(2-ethyl-2-oxazoline); poly(2-vinylpyridine); poly (allylamine); polyacrylamide; polymethacrylamide; and a cationic polymer functionalized with quaternary ammonium groups. Adhesive layers may be post cured by, for example, heat or radiation such as UV after lamination.

The entirety of the stack, e.g., including a substrate (53), can be sealed with an edge seal (51) as shown in FIG. 6. The edge seal (51) may include any of the sealing compositions described above. The edge seal (51) may be continuous around the light-collimating layer (10) and substrate (53), or the edge seal (51) may only cover a portion of the stack, e.g., only the outer edge of the light-collimating layer (10). In some embodiments, the edge seal (51) may include an additional protective layer, e.g., a layer that is impermeable to water, e.g., clear polyethylene. The protective layer may provide moisture or gas barrier properties. The edge of the protective layer and or edge seal may be sealed with a thermal or UV curable or thermal activated edge seal material that provides moisture or gas barrier properties. In an embodiment, the edge seal is sandwiched by two protective substrates.

In some embodiments, the edge seal (51) will actually incase the entire stack, thereby creating a sealed assembly. While not shown, it is understood that one or more electrical connections may have to traverse the edge seal (51) to provide an electrical connection to the first (12) and second (14) electrodes. Such connections may be provided by a flexible ribbon connector.

Figure 7:
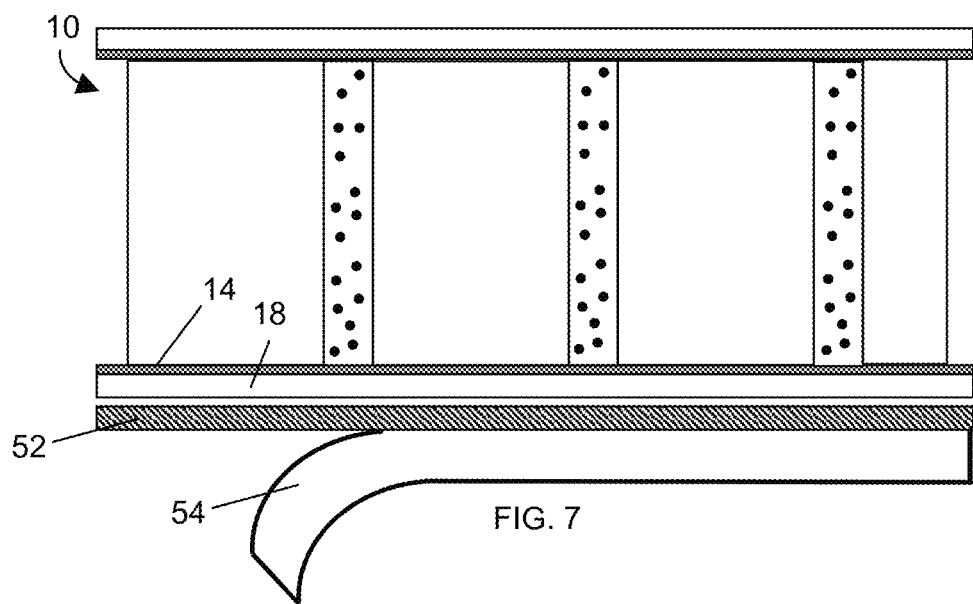
FIG. 7 illustrates a switchable light-collimating film that has an optically clear adhesive and a release sheet on one side. Such films may be used, for example, to provide collimating features on existing surfaces, such as a glass windows.

In addition to showing the details of the sealing layer (28), FIG. 6 also illustrates how a light-collimating layer (10) can be laminated onto the substrate (53) such as glass or another clear durable material. While it is not shown in FIG. 6, it is noted that the light-collimating layer (10) may be protected on both top and bottom with a substrate. The two substrates may be different or the same, for example, a first substrate may be glass and a second substrate may be polyethylene. An edge seal (51) may extend around both top and bottom substrates and the light-collimating layer (10) between substrates. Typically, an optical adhesive (52), such as available from Delo Adhesives, is used to bond the light-collimating layer (10) to the substrate(s) (53). Alternatively, a light-collimating layer (10) may be coated with a combination of an optical adhesive (52) and a release sheet (54) whereby the light-collimating layer (10) with release sheet (54) can be rolled-up and transported to an assembly facility where it will be cut to size. Prior to being deployed, the release sheet (54) can be removed, and the light-collimating layer (10) can be attached directly to the substrate (53), as illustrated in FIG. 7. The substrate may be any clear surface for which light collimation is desired, such as a conference room window, automotive glass, or a diffuser in an LCD stack.

Fabricating Light-Collimating Layer

Figure 8:
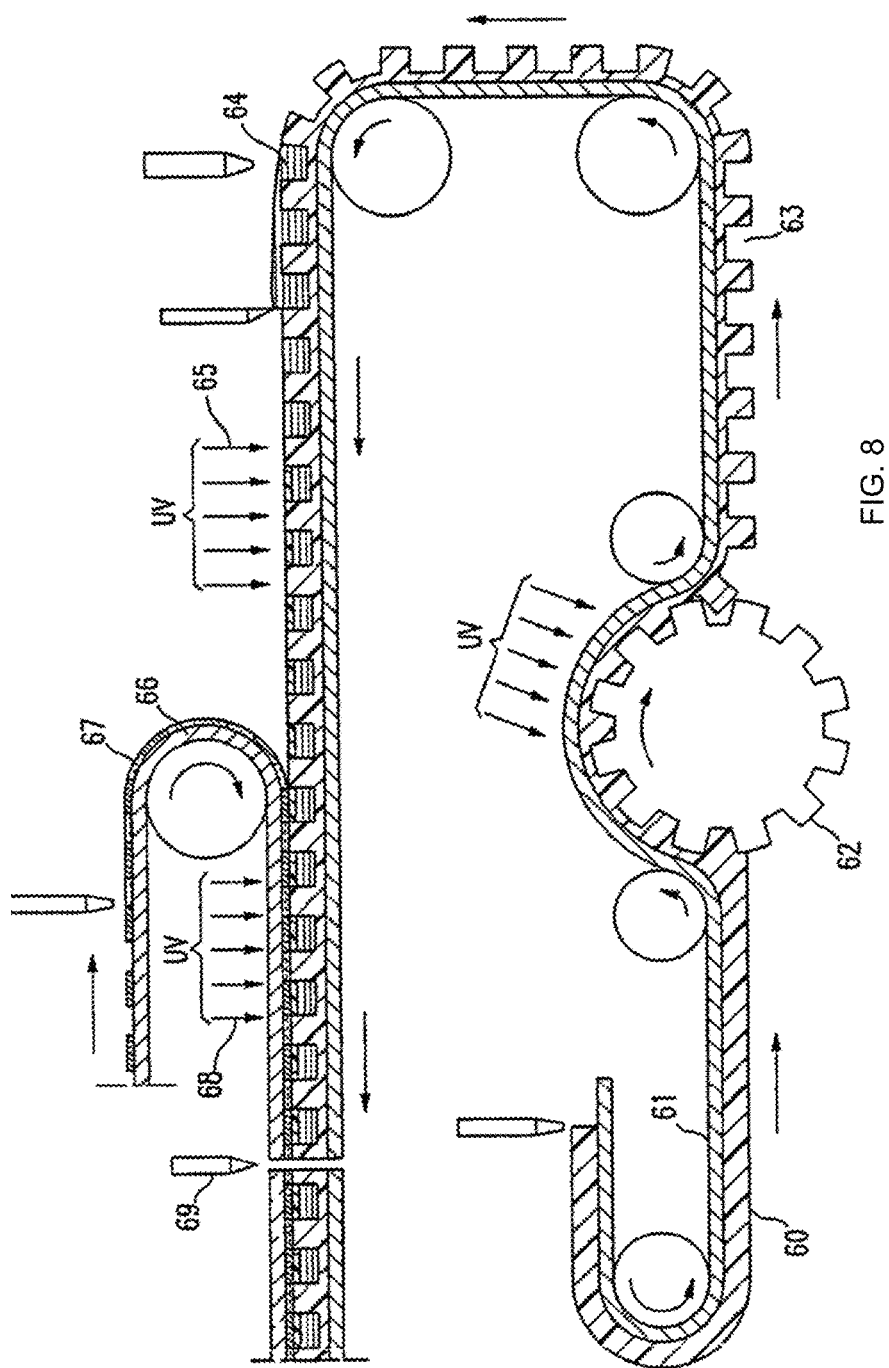
FIG. 8 illustrates a roll-to-roll process that can be used for forming a collimating layer with a plurality of elongated chambers and subsequently filling the elongated chambers with a bistable electrophoretic fluid and sealing the filled elongated chambers.

A light-collimating film can be produced using a roll-to-roll process as illustrated in FIG. 8, and described in detail in U.S. Pat. No. 9,081,250. As shown in FIG. 8, the process involves a number of steps: In the first step a layer (60) of an embossing composition, e.g., a thermoplastic, thermoset, or a precursor thereof, optionally with a solvent, is deposited on a conductive transparent film (61), such as a film of polyethylene terephthalate (PET) including a layer of indium-tin oxide (PET-ITO). (The solvent, if present, readily evaporates.) A primer layer (i.e., an electrode protection layer) may be used to increase the adhesion between the layer of embossing composition and the supporting layer, which may be the PET. Additionally, an adhesion promoter may be used in the primer layer to improve adhesion to the supporting layer. In the second step, the layer (60) is embossed at a temperature higher than the glass transition temperature of the layer material by a pre-patterned embossing tool (62), the fabrication of which is described below. (The primer and/or adhesion promoter may be adjusted to decrease adhesion to the embossing tool (62).) In the third step, the patterned layer (60) is released from the embossing tool (62) preferably during or after it is hardened, e.g., by cooling. The characteristic pattern of the elongated chambers (as described above) is now established. In step four, the elongated chambers (63) are filled with a bistable electrophoretic fluid (64), described above. In some embodiments, the bistable electrophoretic fluid will include a sealing composition that is incompatible with the electrophoretic fluid (64) and has a lower specific gravity than the solvent and the pigment particles in the electrophoretic fluid (64). In such embodiments, the sealing composition will rise to the top of the elongated chambers (63), whereby it can be hardened in subsequent steps. As an alternative (not shown in FIG. 8), the sealing composition may be overcoated after the elongated chambers (63) are filled with the electrophoretic fluid (64). In the next step, the elongated chambers (63) filled with electrophoretic fluid (64) are sealed by hardening the sealing composition, for example with UV radiation (65), or by heat, or moisture. In the sixth step, the sealed elongated chambers are laminated to a second transparent conductive film (66), which may be pre-coated with an optically clear adhesive layer (67), which may be a pressure sensitive adhesive, a hot melt adhesive, a heat, moisture, or radiation curable adhesive. [Preferred materials for the optically-clear adhesive include acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers, and copolymers.] In the final step the finished sheets of switchable light-collimating film may be cut, e.g., with a knife edge (69), or with a laser cutter. In some embodiments, an eighth step, including laminating another optically-clear adhesive and a release sheet may be performed on the finished switchable light-collimating film so that the film can be shipped in section sheets or rolls and cut to size when it is to be used, e.g., for incorporation into a display, a window, or other device/substrate.

The embossing tool (62) may be prepared by a photoresist process followed by either etching or electroplating. It is then coated with a layer of photoresist and exposed to UV. A mask is placed between the UV and the layer of photoresist. In some embodiments, the unexposed or exposed areas are then removed by washing them with an appropriate organic solvent or aqueous solution. The remaining photoresist is dried and sputtered again with a thin layer of seed metal. The master is then ready for electroforming. A typical material used for electroforming is nickel cobalt. Alternatively, the master can be made of nickel by nickel sulfamate electroforming or electroless nickel deposition. The floor of the embossing tool is typically between 50 and 5000 microns thick. The master can also be made using other microengineering techniques including e-beam writing, dry etching, chemical etching, laser writing or laser interference as described in "Replication techniques for micro-optics", SPIE Proc. Vol. 3099, pp 76-82 (1997). Alternatively, the embossing tool can be made by photomachining using plastics, ceramics or metals. Several methods for embossing tool production are described in greater detail below.

Figure 9A:
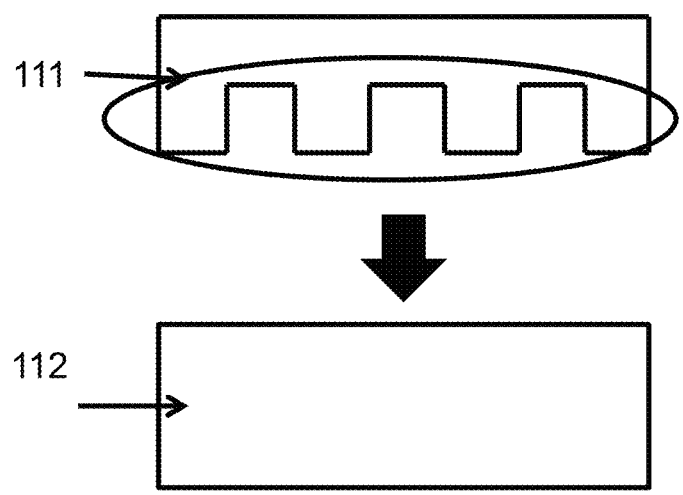
FIGS. 9A and 9B illustrate a simplified embossing process.
Figure 9B:
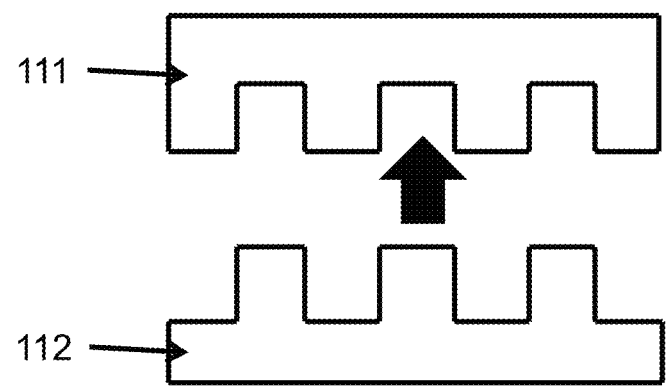

FIGS. 9A and 9B illustrate the embossing process with an embossing tool (111), with a three-dimensional microstructure (circled) on its surface. As shown in FIGS. 9A and 9B, after the embossing tool (111) is applied to the embossing composition (112) of at least 20 μm thick, e.g., at least 40 μm thick, e.g., at least 50 μm thick, e.g., at least 60 μm thick, e.g., at least 80 μm thick, e.g., at least 100 μm thick, e.g., at least 150 μm, e.g., at least 200 μm thick, e.g., at least 250 μm thick. After the embossing composition is cured (e.g., by radiation), or the hot-embossable material becomes embossed by heat and pressure, the embossed material is released from the embossing tool (see FIG. 9B), leaving behind elongated chambers of the requisite dimensions, e.g., wherein a height of the elongated chambers is equal to or less than the thickness of the collimating layer (embossing composition), and wherein a width of the elongated chambers is between 9 μm and 150 μm, and a length of the chambers is between 200 μm and 5 mm.

Using a conventional embossing tool, the cured or hot embossed material sometimes does not completely release from the tool because of the undesired strong adhesion between cured or hot embossed material and the surface of the embossing tool. In this case, there may be some cured or hot embossed material transferred to, or stuck on, the surface of the embossing tool, leaving an uneven surface on the object formed from the process.

This problem is even more pronounced if the object is formed on a supporting layer, such as a transparent conductive layer or a polymeric layer. If the adhesion between the cured or hot embossed material and the supporting layer is weaker than the adhesion between the cured or hot embossed material and the surface of the embossing tool, the release process of the cured or hot embossed material from the embossing tool may cause separation of the object from the supporting layer.

In some cases, an object may be formed on a stack of layers. In this case, if the adhesion between any two of the adjacent layers is weaker than the adhesion between the cured or hot embossed material and the surface of the embossing tool, the release process of the cured or hot embossed material from the embossing tool could cause a break-down between the two layers.

The above-described problems are especially a concern when the cured embossing composition or hot embossed material does not adhere well to certain supporting layers. For example, if the supporting layer is a polymeric layer, the adhesion between the polymeric layer and a cured or hot embossed embossing composition is weak in case one of them is hydrophilic and the other is hydrophobic. Therefore, it is preferred that either both of the embossing composition and the supporting layer are hydrophobic or both are hydrophilic.

Suitable hydrophilic compositions for forming the embossing layer or supporting layer may comprise a polar oligomeric or polymeric material. As described in U.S. Pat. No. 7,880,958, such a polar oligomeric or polymeric material may be selected from the group consisting of oligomers or polymers having at least one of the groups such as nitro ($-NO_2$), hydroxyl ($-OH$), carboxyl ($-COO$), alkoxy ($-OR$ wherein R is an alkyl group), halo (e.g., fluoro, chloro, bromo or iodo), cyano ($-CN$), sulfonate ($-SO_3$) and the like. The glass transition temperature of the polar polymer material is preferably below about 100° C. and more preferably below about 60° C. Specific examples of suitable polar oligomeric or polymeric materials may include, but are not limited to, polyvinyl alcohol, polyacrylic acid, poly(2-hydroxylethyl methacrylate), polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

The embossing tool (111) may be used directly to emboss the composition (112). More typically, the embossing tool (111) is mounted on a plain drum to allow rotation of the embossing sleeve over the embossing composition (112). The embossing drum or sleeve (121) is usually formed of a conductive material, such as a metal (e.g., aluminum, copper, zinc, nickel, chromium, iron, titanium, cobalt or the like), an alloy derived from any of the aforementioned metals, or stainless steel. Different materials may be used to form a drum or sleeve. For example, the center of the drum or sleeve may be formed of stainless steel and a nickel layer is sandwiched between the stainless steel and the outermost layer, which may be a copper layer.

Figure 10:
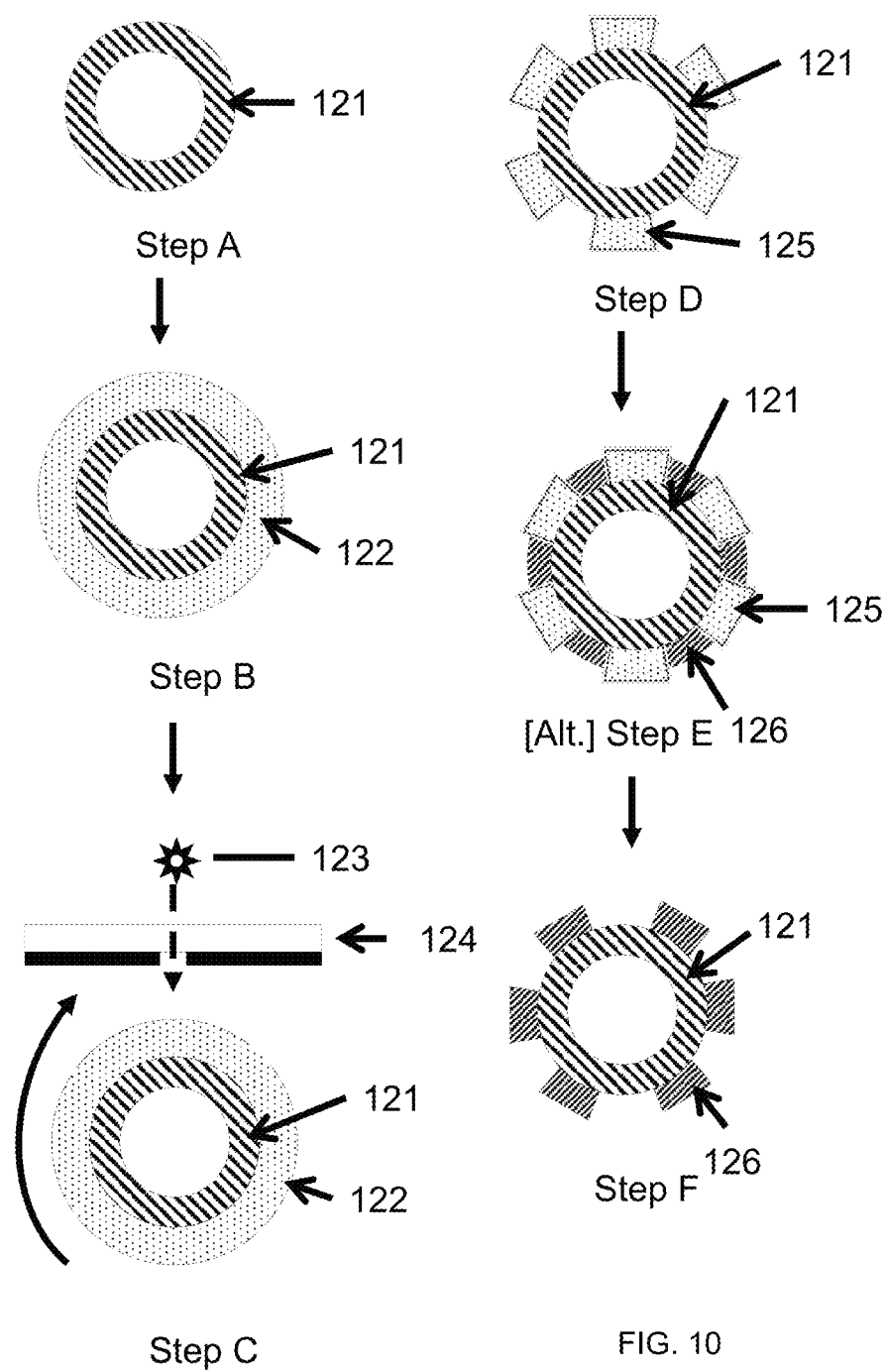
FIG. 10 details a method for forming an embossing tool to create collimating layers of the invention.

METHOD A: The embossing drum or sleeve (121) may be formed of a non-conductive material with a conductive coating or a conductive seed layer on its outer surface, as shown in FIG. 10. Before coating, a photosensitive material (122) on the outer surface of a drum or sleeve (21), as shown in step B of FIG. 10, precision grinding and polishing may be used to ensure smoothness of the outer surface of the drum or sleeve. A photosensitive material (122), e.g., a photoresist, can then be coated on the outer surface of the drum or sleeve (121). The photosensitive material may be of a positive tone, negative tone or dual tone. The photosensitive material may also be a chemically amplified photoresist. The coating may be carried out using dip, spray or ring coating. After drying and/or baking, the photosensitive material may be subjected to exposure, as shown in step C of FIG. 10, e.g., by exposing the photosensitive material to a light source. Alternatively, the photosensitive material (122) can be a dry film photoresist that is laminated onto the outer surface of the drum or sleeve (121). When a dry film is used, it is also exposed to a light source as described.

In step C of FIG. 10, a suitable light source (123), e.g., IR, UV, e-beam or laser, is used to expose the photosensitive material coated or a dry film photoresist (122) laminated on the drum or sleeve (121). The light source can be a continuous or pulsed light. A photomask (124) is optionally used to define the three-dimensional microstructure to be formed. Depending on the microstructure, the exposure can be step-by-step, continuous or a combination thereof. After exposure, the photosensitive material (122) may be subjected to post-exposure treatment, e.g., baking, before development. Depending on the tone of the photosensitive material, either exposed or un-exposed areas will be removed by using a developer. After development, the drum or sleeve with a patterned photosensitive material (125) on its outer surface (as shown in Step D of FIG. 10) may be subjected to baking or blanket exposure before deposition (e.g., electroplating, electroless plating, physical vapor deposition, chemical vapor deposition or sputtering deposition). The thickness of the patterned photosensitive material is preferably greater than the depth or height of the three-dimensional microstructure to be formed.

A metal or alloy (e.g., nickel, cobalt, chrome, copper, zinc or an alloy derived from any of the aforementioned metals) can be electroplated and/or electroless plated onto the drum or sleeve. The plating material (126) is deposited on the outer surface of the drum or sleeve in areas that are not covered by the patterned photosensitive material. The deposit thickness is preferably less than that of the photosensitive material, as shown in step E of FIG. 10. The thickness variation of the deposit over the whole drum or sleeve area can be controlled to be less than 1%, by adjusting plating conditions, e.g., the distance between the anode and the cathode (i.e., drum or sleeve) if electroplating is used, the rotation speed of the drum or sleeve and/or circulation of the plating solution.

Alternatively, in the case of using electroplating to deposit the plating material (126), the thickness variation of the deposit over the entire surface of the drum or sleeve may be controlled by inserting a non-conductive thickness uniformer between a cathode (i.e., the drum or sleeve) and an anode, as described in U.S. Pat. No. 8,114,262, the content of which is incorporated herein by reference in its entirety.

After plating, the patterned photosensitive material (125) can be stripped by a stripper (e.g., an organic solvent or aqueous solution). A precision polishing may be optionally employed to ensure acceptable thickness variation and degree of roughness of the deposit (126) over the entire drum or sleeve. Step F of FIG. 10 shows a cross-section view of an embossing drum or sleeve with a three-dimensional pattern microstructure formed thereon.

Figure 11:
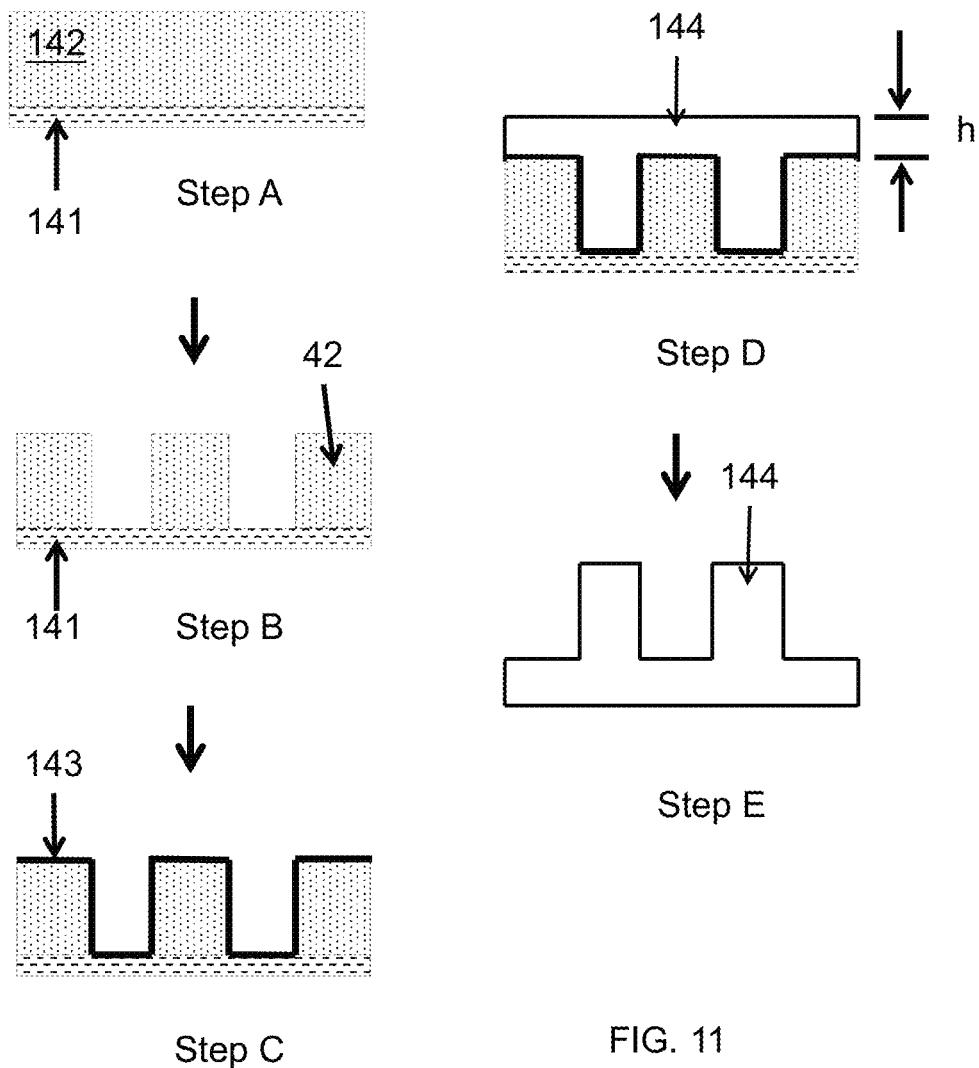
FIG. 11 details a method for forming a shim to be used in an embossing tool.

METHOD B: Alternatively, a three-dimensional microstructure may be formed on a flat substrate, as shown in FIG. 11. In Step A of FIG. 11, a photosensitive material (142) is coated on a substrate layer (141) (e.g., a glass substrate). The photosensitive material (142), as stated above, may be of a positive tone, negative tone or dual tone. The photosensitive material (142) may also be a chemically amplified photoresist. The coating may be carried out using dip, spray, slot die, or spin coating. After drying and/or baking, the photosensitive material is subjected to exposure to a suitable light source (not shown) through a photomask (not shown). Alternatively, the photosensitive material (142) can be a dry film photoresist (which is usually commercially available) that is laminated onto the substrate (141). The dry film is also exposed to a light source as described above, In Step B of FIG. 11, after exposure, depending on the tone of the photosensitive material, either the exposed or the unexposed areas of the photosensitive material will be removed by using a developer. After development, the substrate layer (141) with the remaining photosensitive material (142) may be subjected to baking or blanket exposure before Step C. The thickness of the remaining photosensitive material should be the same as the depth or height of the three-dimensional microstructure to be formed. In the Step C, an electrical conductive seed layer (143) is coated over the remaining photosensitive material (142) and the substrate (141) in areas not occupied by the photosensitive material. The electrical conductive seed layer is usually formed of silver; however, other conductive materials, such as gold or nickel may also be used.

In Step D, a metal or alloy (144) (e.g., nickel, cobalt, chrome, copper, zinc, or an alloy derived from any of the aforementioned metals) is electroplated and/or electroless plated onto the surface covered by electrical conductive seed layer and the plating process is carried out until there is enough plated material thickness (h) over the patterned photosensitive material. The thickness (h) in Step D of FIG. 11 is preferably 25 to 5000 microns, and more preferably 25 to 1000 microns.

After plating, the plated material (144) is separated from the substrate layer (141) which is peeled off. The photosensitive material (142) along with the electrical conductive seed layer (143) is removed. The photosensitive material may be removed by a stripper (e.g., an organic solvent or an aqueous solution). The electrical conductive seed layer (143) may be removed by an acidic solution (e.g., sulfuric/nitric mixture) or commercially available chemical strippers, leaving behind only a metal sheet (144) having a three-dimensional structure on one side and being flat on the other side. A precision polishing may be applied to the metal sheet (144), after which the flat shim may be used directly for embossing, or it may be mounted on (i.e., wrapped over) a drum with the three-dimensional microstructure on the outer surface to form an embossing tool. A precious metal or alloy thereof is finally coated over the entire surface of the embossing tool, as described above. As stated above, gold or its alloy is preferred over other precious metals and alloys due to its lack of reactivity.

Figure 12:
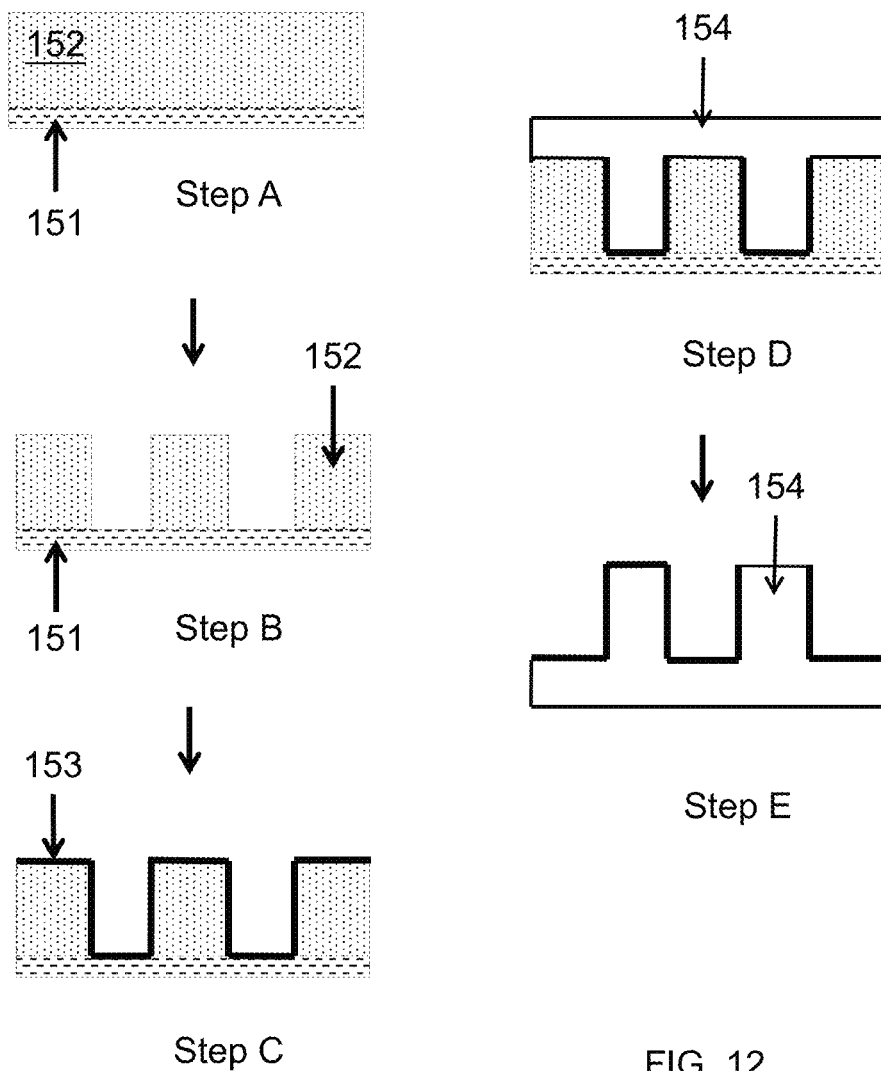
FIG. 12 details an alternate method for forming a shim to be used in an embossing tool.

METHOD C: A further alternative method is demonstrated in FIG. 12. This method is similar to that of FIG. 11, but simplified. Instead of an electrical conductive seed layer such as silver, a layer of precious metal or alloy thereof (153) is simply coated over the photosensitive material (152). As stated above, gold or its alloy is preferred. Consequently, in Step E, after the plated material (154) is separated from the substrate (151), only the photosensitive material (152) is removed, the gold or alloy coating (153) remains with the metal sheet (154) with a three-dimensional structure on one side and being flat on the other side.

Examples of components in a composition for forming the collimating layer, may include, but are not limited to, thermoplastic or thermoset materials or a precursor thereof, such as multifunctional vinyls including, but not limited to, acrylates, methacrylates, allyls, vinylbenzenes, vinylethers, multifunctional epoxides and oligomers or polymers thereof, and the like. Multifunctional acrylate and oligomers thereof are often used. A combination of a multifunctional epoxide and a multifunctional acrylate is also useful to achieve desirable physico-mechanical properties of the collimating layer. A low Tg (glass transition temperature) binder or crosslinkable oligomer imparting flexibility, such as urethane acrylate or polyester acrylate, may also be added to improve the flexure resistance of the embossed privacy layers.

Further examples of compositions for a collimating layer may comprise a polar oligomeric or polymeric material. Such a polar oligomeric or polymeric material may be selected from the group consisting of oligomers or polymers having at least one of the groups such as nitro (—NO$_2$), hydroxyl (—OH), carboxyl (—COO), alkoxy (—OR wherein R is an alkyl group), halo (e.g., fluoro, chloro, bromo or iodo), cyano (—CN), sulfonate (—SO$_3$) and the like. The glass transition temperature of the polar polymer material is preferably below about 100° C., and more preferably below about 60° C. Specific examples of suitable polar oligomeric or polymeric materials may include, but are not limited to, polyhydroxy functionalized polyester acrylates (such as BDE 1025, Bomar Specialties Co, Winsted, Conn.) or alkoxylated acrylates, such as ethoxylated nonyl phenol acrylate (e.g., SR504, Sartomer Company), ethoxylated trimethylolpropane triacrylate (e.g., SR9035, Sartomer Company) or ethoxylated pentaerythritol tetraacrylate (e.g., SR494, from Sartomer Company).

Alternatively, the collimating layer composition may comprise (a) at least one difunctional UV curable component, (b) at least one photoinitiator, and (c) at least one mold release agent. Suitable difunctional components may have a molecular weight higher than about 200. Difunctional acrylates are preferred and difunctional acrylates having a urethane or an ethoxylated backbone are particularly preferred. More specifically, suitable difunctional components may include, but are not limited to, diethylene glycol diacrylate (e.g., SR230 from Sartomer), triethylene glycol diacrylate (e.g., SR272 from Sartomer), tetraethylene glycol diacrylate (e.g., SR268 from Sartomer), polyethylene glycol diacrylate (e.g., SR295, SR344 or SR610 from Sartomer), polyethylene glycol dimethacrylate (e.g., SR603, SR644, SR252 or SR740 from Sartomer), ethoxylated bisphenol A diacrylate (e.g., CD9038, SR349, SR601 or SR602 from Sartomer), ethoxylated bisphenol A dimethacrylate (e.g., CD540, CD542, SR101, SR150, SR348, SR480 or SR541 from Sartomer), and urethane diacrylate (e.g., CN959, CN961, CN964, CN965, CN980 or CN981 from Sartomer; Ebecryl 230, Ebecryl 270, Ebecryl 8402, Ebecryl 8804, Ebecryl 8807 or Ebecryl 8808 from Cytec). Suitable photoinitiators may include, but are not limited to, bis-acyl-phosphine oxide, 2-benzyl-2-(dimethylamino)-1-[4-(4-morpholinyl) phenyl]-1-butanone, 2,4,6-trimethylbenzoyl diphenyl phosphine oxide, 2-isopropyl-9H-thioxanthen-9-one, 4-benzoyl-4'-methyldiphenylsulphide and 1-hydroxy-cyclohexyl-phenyl-ketone, 2-hydroxy-2-methyl-1-phenyl-propan-1-one, 1-[4-(2-hydroxyethoxy)-phenyl]-2-hydroxy-2-methyl-1-propane-1-one, 2,2-dimethoxy-1,2-diphenylethan-1-one or 2-methyl-1 [4-(methylthio)phenyl]-2-morpholinopropan-1-one. Suitable mold release agents may include, but are not limited to, organomodified silicone copolymers such as silicone acrylates (e.g., Ebercryl 1360 or Ebercyl 350 from Cytec), silicone polyethers (e.g., Silwet 7200, Silwet 7210, Silwet 7220, Silwet 7230, Silwet 7500, Silwet 7600 or Silwet 7607 from Momentive). The composition may further optionally comprise one or more of the following components, a co-initiator, monofunctional UV curable component, multifunctional UV curable component or stabilizer.

Arrangement of Elongated Chambers

Two geometries of light-collimating layers resulting from the fabrication methods described above a shown in FIGS. 13 and 14 (view from above). These geometries show the general trend in the aspect ratios of the elongated chambers (22) in that they are longer in one direction (L) than another (W). That is, the length (L) of an elongated chamber is typically at least twice the width (W) of the elongated chamber, e.g., at least three times the width of the elongated chamber, e.g., at least four times the width of the elongated chamber, e.g., at least five times the width of the elongated chamber, e.g., at least ten times the width of the elongated chamber. [As discussed above, the height (H) (out of the plane of the page in FIGS. 13 and 14) of the elongated chambers is equal to or less than the thickness of the collimating layer.] Typically, the width of each elongated chamber is between 9 µm and 150 µm. Typically, the length of each elongated chamber is between 200 µm and 5 mm.

Figure 13:
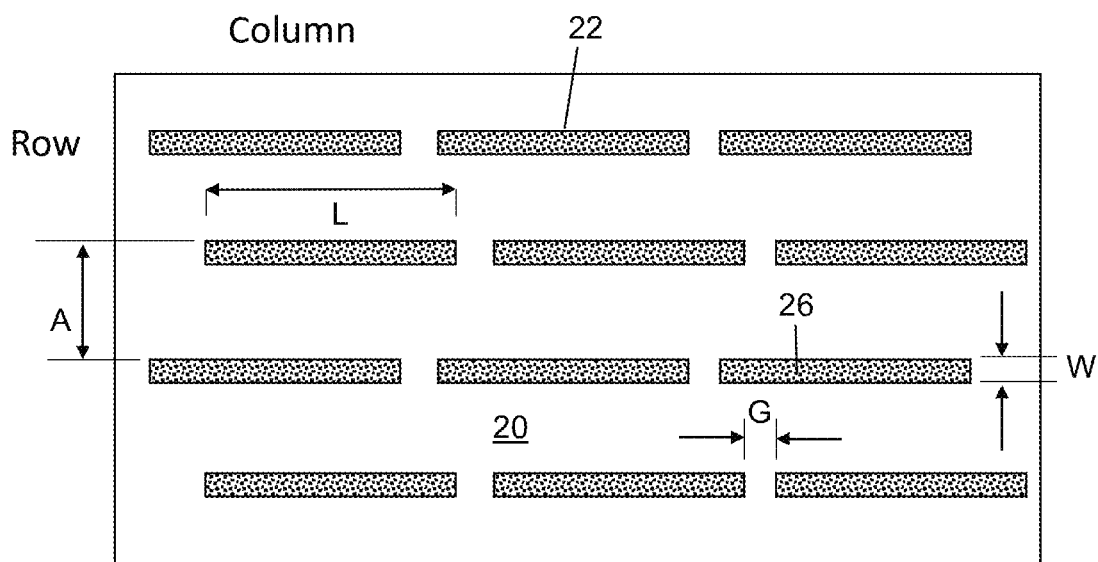
FIG. 13 is a top view of an embodiment of a switchable light-collimating film in which elongated chambers are arranged in a row-column format.

The spacing between rows (A) (a.k.a. "pitch") plays a major role in determining how much the viewing angle is reduced when the electrophoretic pigments (26) are fully distributed in the elongated chambers (22), as discussed previously. If the height of the elongated chambers (22) remains constant, the viewing angle narrows with decreasing spacing "A." However, decreasing "A" means that there is more bistable electrophoretic fluid (24) with pigment particles for the light to traverse, and the overall light transmission of the light-collimating film decreases. In a similar fashion, the gap width "G" between adjacent elongated chambers within the same row also affects the overall transmission of the light-collimating layer because of the amount of scattering particles between the light source and the viewer. Thus, the overall transmission of FIG. 13 is lower than the overall transmission of FIG. 14. However, there is less "leakage" of non-collimated light in FIG. 13 because there are fewer off-axis pathways for incident light to travel past the elongated chambers.

Figure 14:
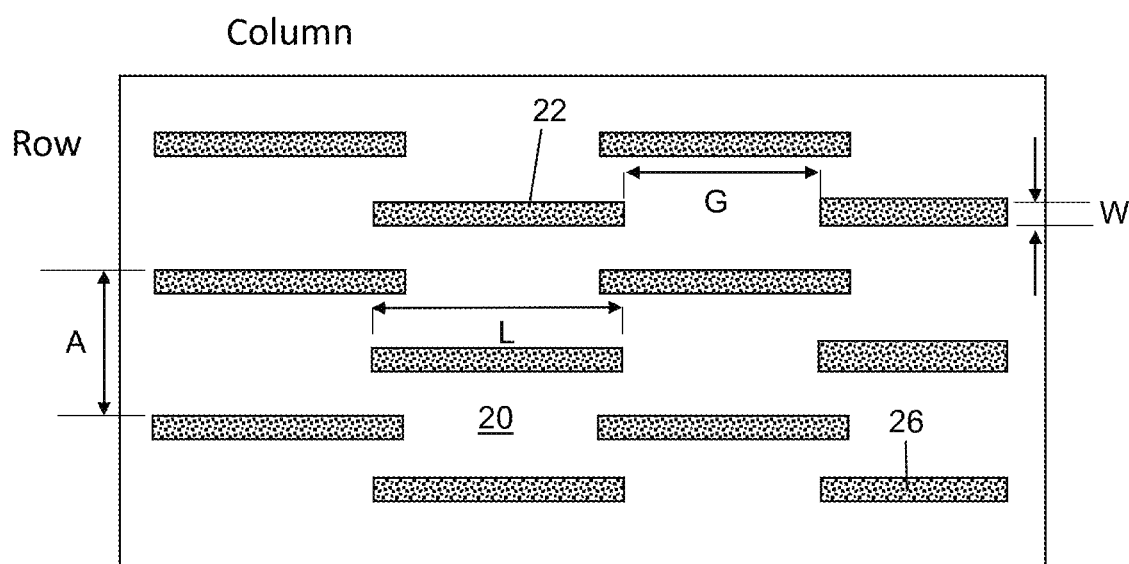
FIG. 14 is a top view of an embodiment of a switchable light-collimating film in which elongated chambers are arranged in a row-column format.

In some embodiments, when the elongated chambers are created with a rolling embossing tool, e.g., as described above, the elongated chambers are formed in rows and columns (as viewed from above). In an effort to minimize leakage, the gaps between adjacent elongated chambers in the first row are offset horizontally from the gaps between adjacent elongated chambers in the second row in both FIG. 13 and FIG. 14. In general the gap width "G" between adjacent elongated chambers within the same row is less than 30 µm, e.g., less than 25 µm, e.g., less than 20 µm, e.g., less than 15 µm, e.g., less than 10 µm. The gaps between adjacent elongated chambers in successive rows may be offset by at least 1 µm, e.g., at least 2 µm, e.g., at least 3 µm, e.g., at least 5 µm. In some embodiments, the entire gap of a first row is spanned by the elongated chamber of a second row, as shown in FIG. 14. In most embodiments, L>G. In many embodiments, L>>G. In most embodiments A>W. In many embodiments A>>W.

Figure 15:
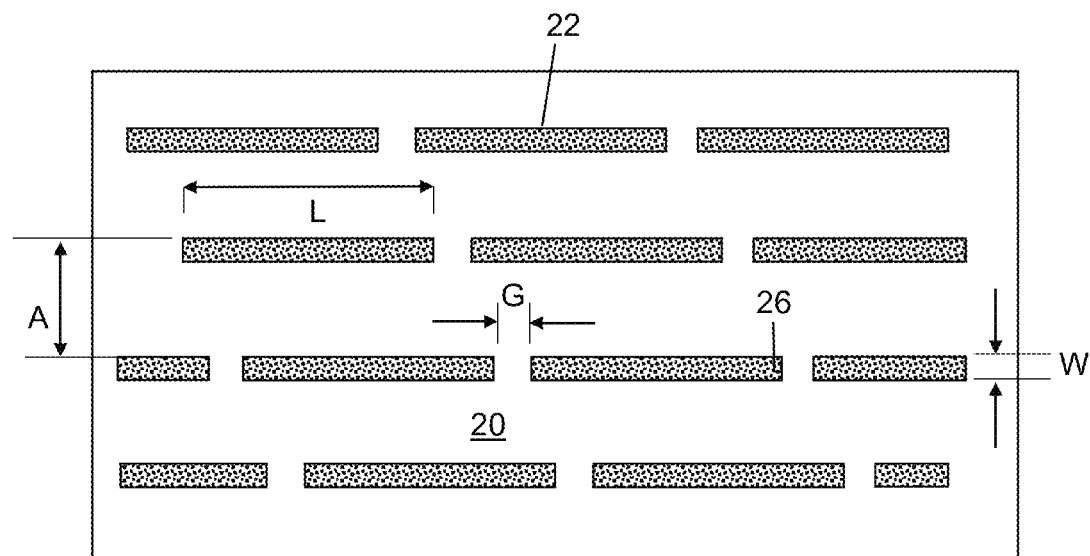
FIG. 15 is a top view of an embodiment of a switchable light-collimating film in which the location of the gap between elongated chambers in the same row progresses in a direction between successive rows, thereby breaking the column symmetry.
Figure 16:
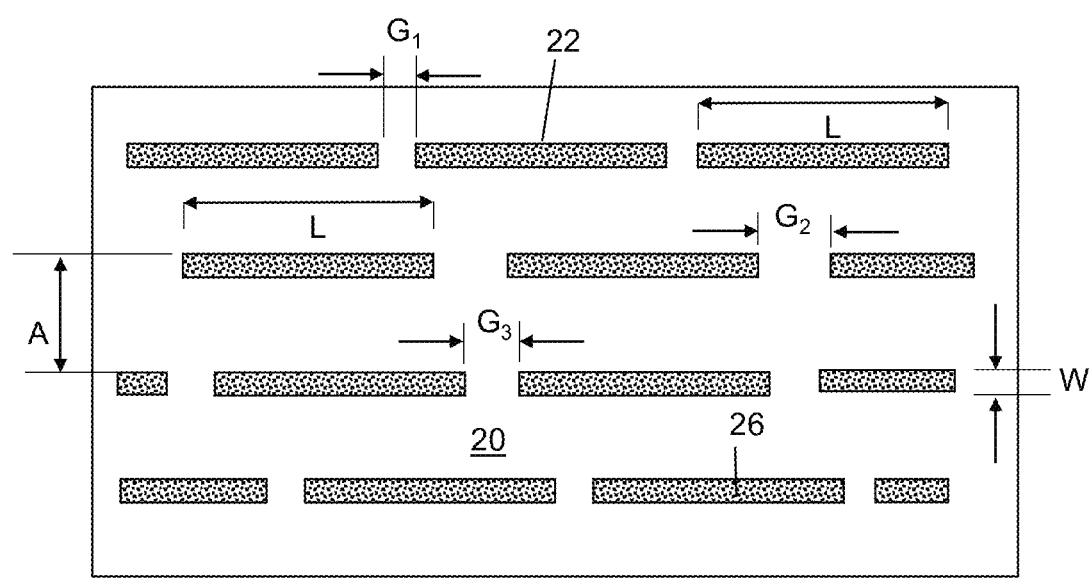
FIG. 16 is a top view of an embodiment of a switchable light-collimating film in which the size of the gap elongated chambers in the same row is different between successive rows, thereby breaking the column symmetry.
Figure 17:
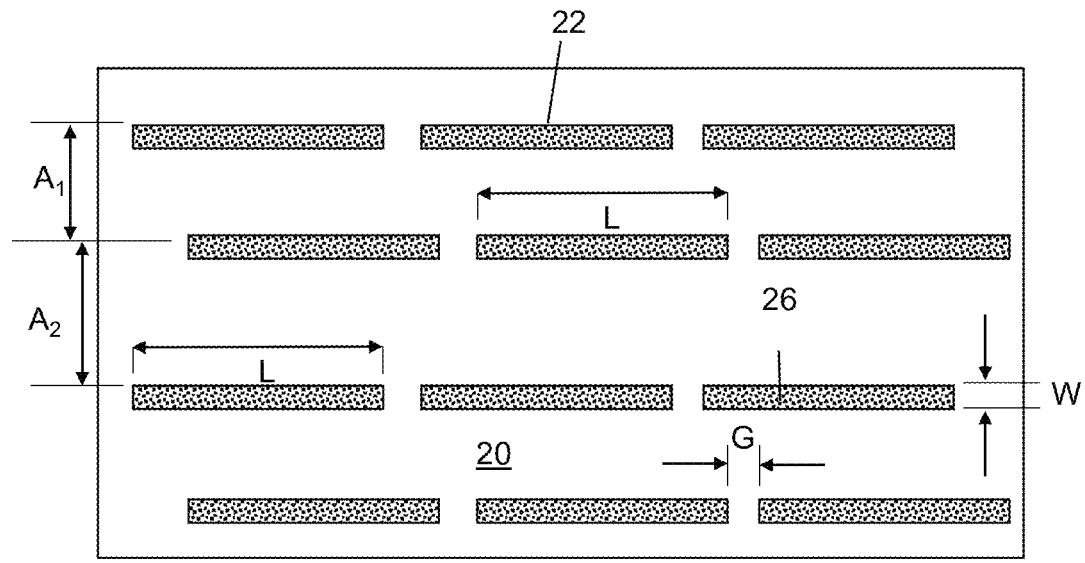
FIG. 17 is a top view of an embodiment of a switchable light-collimating film in which the pitch between successive rows is varied, thereby breaking the row symmetry.
Figure 18:
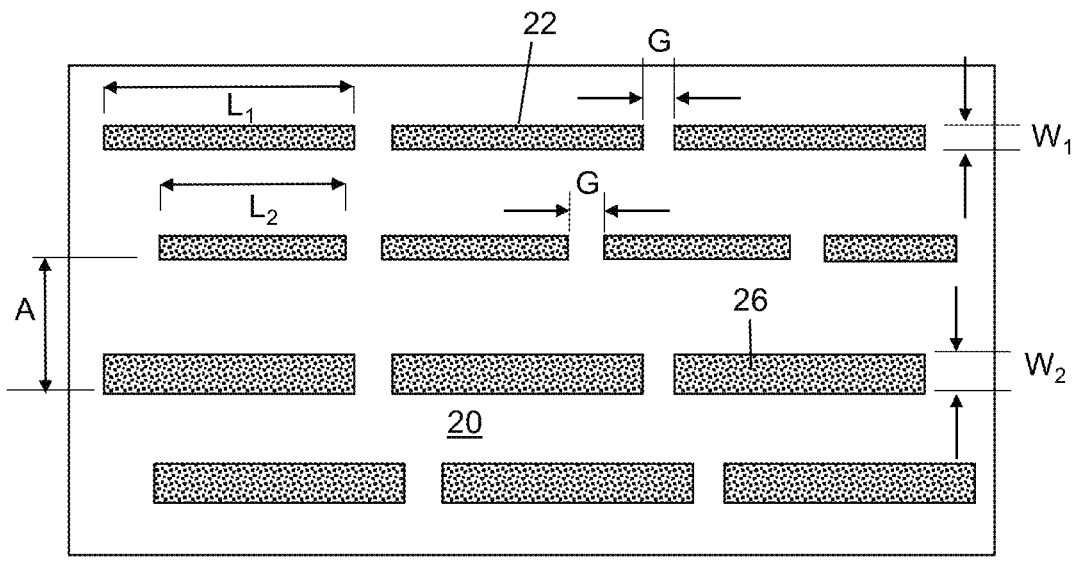
FIG. 18 is a top view of an embodiment of a switchable light-collimating film in which the length and/or width of the chambers is varied between successive rows, thereby breaking the row and column symmetry.

Because the spacing between the elongated chambers is on the order of the wavelength of visible light, repeating patterns, such as FIGS. 13 and 14 may produce undesired interference effects for a view, which may manifest as spots, moiré, speckle, or other visible defect. A number of alterations can be made to the design of the light-collimating layer (10) to defeat these interference effects. For example, the position of the gap between adjacent elongated chambers (22) can be "walked" laterally with each successive row, as shown in FIG. 15. Alternatively, or in addition, the gap width (G) may be altered between adjacent elongated chambers (22) for different rows, as shown in FIG. 16. In addition, the gap width (G) may be altered between elongated chambers (22) within the same row. Alternatively, or in addition, the pitch (A) between rows may be modified across the light-collimating film, as shown in FIG. 17. Alternatively, or in addition, the length (L) of each elongated chamber (22) may be modified within a single row and/or between rows. Furthermore, the width (W) of each elongated chamber (22) may be modified within a single row and/or between rows, as shown in FIG. 18. While the embossing process described herein is repetitive in that it is done with a rolling tool, it is possible to defeat symmetry by making most of the features on the roll non-symmetric. The repeat pattern caused by the rolling embossing tool is typically on the order of 20 cm, so it does not produce interference effects.

Numerous patents and applications assigned to or in the names of the Massachusetts Institute of Technology (MIT), E Ink Corporation, E Ink California, LLC, and related companies describe various technologies used in encapsulated and microcell electrophoretic and other electro-optic media. Encapsulated electrophoretic media comprise numerous small capsules, each of which itself comprises an internal phase containing electrophoretically mobile particles in a fluid medium, and a capsule wall surrounding the internal phase. Typically, the capsules are themselves held within a polymeric binder to form a coherent layer positioned between two electrodes. In a microcell electrophoretic display, the charged particles and the fluid are not encapsulated within microcapsules but instead are retained within a plurality of cavities formed within a carrier medium, typically a polymeric film.

The technologies described in these patents and applications include:

(a) Electrophoretic particles, fluids and fluid additives; see for example U.S. Pat. Nos. 7,002,728 and 7,679,814; as well as U.S. Patent Applications Publication No. 2016/0170106;

(b) Capsules, binders and encapsulation processes; see for example U.S. Pat. Nos. 6,922,276 and 7,411,719; as well as U.S. Patent Applications Publication No. 2011/0286081.

(c) Microcell structures, wall materials, and methods of forming microcells; see for example U.S. Pat. Nos. 6,672,921; 6,751,007; 6,753,067; 6,781,745; 6,788,452; 6,795,229; 6,806,995; 6,829,078; 6,833,177; 6,850,355; 6,865,012; 6,870,662; 6,885,495; 6,906,779; 6,930,818; 6,933,098; 6,947,202; 6,987,605; 7,046,228; 7,072,095; 7,079,303; 7,141,279; 7,156,945; 7,205,355; 7,233,429; 7,261,920; 7,271,947; 7,304,780; 7,307,778; 7,327,346; 7,347,957; 7,470,386; 7,504,050; 7,580,180; 7,715,087; 7,767,126; 7,880,958; 8,002,948; 8,154,790; 8,169,690; 8,441,432; 8,582,197; 8,891,156; 9,279,906; 9,291,872; and 9,388,307; and U.S. Patent Applications Publication Nos. 2003/0175480; 2003/0175481; 2003/0179437; 2003/0203101; 2013/0321744; 2014/0050814; 2015/0085345; 2016/0059442; 2016/0004136; and 2016/0059617;

(d) Methods for filling and sealing microcells; see for example U.S. Pat. Nos. 6,545,797; 6,751,008; 6,788,449; 6,831,770; 6,833,943; 6,859,302; 6,867,898; 6,914,714; 6,972,893; 7,005,468; 7,046,228; 7,052,571; 7,144,942; 7,166,182; 7,374,634; 7,385,751; 7,408,696; 7,522,332; 7,557,981; 7,560,004; 7,564,614; 7,572,491; 7,616,374; 7,684,108; 7,715,087; 7,715,088; 8,179,589; 8,361,356; 8,520,292; 8,625,188; 8,830,561; 9,081,250; and 9,346,987; and U.S. Patent Applications Publication Nos. 2002/0188053; 2004/0120024; 2004/0219306; 2006/0132897; 2006/0164715; 2006/0238489; 2007/0035497; 2007/0036919; 2007/0243332; 2015/0098124; and 2016/0109780;

(e) Films and sub-assemblies containing electro-optic materials; see for example U.S. Pat. Nos. 6,825,829; 6,982,178; 7,112,114; 7,158,282; 7,236,292; 7,443,571; 7,513,813; 7,561,324; 7,636,191; 7,649,666; 7,728,811; 7,729,039; 7,791,782; 7,839,564; 7,843,621; 7,843,624; 8,034,209; 8,068,272; 8,077,381; 8,177,942; 8,390,301; 8,482,835; 8,786,929; 8,830,553; 8,854,721; 9,075,280; and 9,238,340; and U.S. Patent Applications Publication Nos. 2007/0237962; 2009/0109519; 2009/0168067; 2011/0164301; 2014/0115884; and 2014/0340738;

(f) Backplanes, adhesive layers and other auxiliary layers and methods used in displays; see for example U.S. Pat. Nos.

7,116,318; 7,535,624; and 9,310,661; as well as U.S. Patent Applications Publication Nos. 2016/0103380; and 2016/0187759

(g) Methods for driving displays; see for example U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,514,168; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0091418; 2007/0103427; 2007/0176912; 2008/0024429; 2008/0024482; 2008/0136774; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2015/0262551; 2016/0071465; 2016/0078820; 2016/0093253; 2016/0140910; and 2016/0180777.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. In one embodiment, the backplane is itself flexible and is prepared by printing the pixel electrodes and conductors on a plastic film or other flexible substrate. In other embodiments, both electrodes are flexible, thereby allowing the constructed electrophoretic display to be flexible. The obvious lamination technique for mass production of displays by this process is roll lamination using a lamination adhesive. Similar manufacturing techniques can be used with other types of electro-optic displays. For example, a microcell electrophoretic medium may be laminated to a backplane or flexible electrode in substantially the same manner as an encapsulated electrophoretic medium.

U.S. Pat. No. 6,982,178 describes a method of assembling a solid electro-optic display (including an encapsulated electrophoretic display) which is well adapted for mass production. Essentially, this patent describes a so-called "front plane laminate" ("FPL") which comprises, in order, a light-transmissive electrically conductive layer; a layer of a solid electro-optic medium in electrical contact with the electrically conductive layer; an adhesive layer; and a release sheet. Typically, the light-transmissive electrically conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically conductive layer is conveniently a thin metal or metal oxide layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

Assembly of an electrophoretic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electrophoretic medium and electrically conductive layer to the backplane. This process is well adapted to mass production since the front plane laminate may be mass-produced, typically using roll-to-roll coating techniques, and then cut into pieces of any size needed for use with specific backplanes.

The term "impulse" is used herein in its conventional meaning of the integral of voltage with respect to time. However, some bistable electrophoretic media act as charge transducers, and with such media an alternative definition of impulse, namely the integral of current over time (which is equal to the total charge applied) may be used. The appropriate definition of impulse should be used, depending on whether the medium acts as a voltage-time impulse transducer or a charge impulse transducer.

A further complication in driving electrophoretic displays is the need for so-called "DC balance". U.S. Pat. Nos. 6,531,997 and 6,504,524 discuss problems may be encountered, and the working lifetime of a display reduced, if the method used to drive the display does not result in zero, or near zero, net time-averaged applied electric field across the electrophoretic medium. A drive method which does result in zero net time-averaged applied electric field across the electrophoretic medium is conveniently referred to a "direct current balanced" or "DC balanced".

As already noted, an encapsulated electrophoretic medium typically comprises electrophoretic capsules disposed in a polymeric binder, which serves to form the discrete capsules into a coherent layer. The continuous phase in a polymer-dispersed electrophoretic medium and the cell walls of a microcell medium serve similar functions. It has been found by E Ink researchers that the specific material used as the binder in an electrophoretic medium can affect the electro-optic properties of the medium. Among the electro-optic properties of an electrophoretic medium affected by the choice of binder is the so-called "dwell time dependence". As discussed in the U.S. Pat. No. 7,119,772 (see especially FIG. 34 and the related description), in some cases, the impulse necessary for a transition between two specific optical states of a bistable electrophoretic display varies with the residence time of a pixel in its initial optical state, and this phenomenon is referred to as "dwell time dependence" or "DTD". Obviously, it is desirable to keep DTD as small as possible since DTD affects the difficulty of driving the display and may affect the quality of the image produced; for example, DTD may cause pixels which are supposed to form an area of uniform gray color to differ slightly from one another in gray level, and the human eye is very sensitive to such variations. Although it has been known that the choice of binder affects DTD, choosing an appropriate binder for any specific electrophoretic medium has hitherto been based on trial-and-error, with essentially no understanding of the relationship between DTD and the chemical nature of the binder.

U.S. Patent Application Publication No. 2005/0107564 describes an aqueous polyurethane dispersion comprising a polyurethane polymer comprising the reaction product of: (a) an isocyanate terminated prepolymer comprising the reaction product of (i) at least one polyisocymate comprising a,a,a,a-tetramethylxylene diisocyanate [systematic name 1,3-bis(1-isocyanato-1-methylethyl)benzene; this material may hereinafter be called "TMXDI"]; (ii) at least one difunctional polyol comprising polypropylene glycol, and (iii) an isocyanate reactive compound comprising an acid functional group and at least two isocyanate reactive groups selected from a hydroxy, a primary amino, a secondary amino, and combinations thereof; (b) a neutralizing agent comprising a tertiary amino group; (c) a monofunctional chain terminating agent; (d) a chain extending agent comprising an organic diamine; and (e) water. This polyurethane dispersion, which may hereinafter be called the "TMXDI/PPO" dispersion, has been found to be useful as a lamination adhesive in electrophoretic displays.

From the foregoing, it will be seen that the present invention can provide a switchable light-collimating film and devices that incorporate switchable light-collimating films. In particular, the invention provides light-collimating films that are bistable and able to maintain wide and narrow viewing conditions with no additional energy input.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

We claim:

1. A method of fabrication of a switchable light-collimating film comprising the steps:
    providing a first light-transmissive electrode layer;
    depositing an embossing composition on the surface of the first light-transmissive electrode layer, creating a layer of embossing composition;
    embossing the embossing composition at a temperature higher than the glass transition temperature of the layer of the embossing composition material, using a pre-patterned embossing tool, creating a patterned layer;
    releasing the patterned layer from the embossing tool, creating a collimating layer having a plurality of elongate chambers, each elongated chamber having an opening, each elongated chamber having height, length (L), and width (W), the collimating layer having a thickness of at least 20 µm, the plurality of the elongated chambers being arranged in rows and columns when the collimating layer is viewed from above, the longer dimension of the elongated chambers running along rows, first row of elongated chambers including a gap between elongated chambers of first column and second column, second row of elongated chambers including a gap between elongated chambers of first column and second column, third row of elongated chambers including a gap between elongated chambers of first column and second column, the gap between elongated chambers of first column and second column in the first row being offset horizontally from the gap between elongated chambers of first column and second column in the second row, the gap between elongated chambers of first column and second column in the second row being offset horizontally from the gap between elongated chambers of first column and second column in the third row, the gap between elongated chambers of first column and second column in the first row being offset horizontally from the gap between elongated chambers of first column and second column in the third row,
    filling each chamber of the plurality of the elongated chambers through their opening with a bistable electrophoretic fluid comprising pigment particles;
    sealing the openings of the plurality of filled elongated chambers with a sealing composition, forming a sealing layer spanning the opening of each of the plurality of the elongated chambers;
    laminating the sealed elongated chambers to a second light-transmissive electrode layer, wherein the first and second light-transmissive electrode layers are disposed on either side of the collimating layer.

2. The method of fabrication of a switchable light-collimating film according to claim 1, wherein the collimating layer comprises a polymer including acrylate monomers, urethane monomers, styrene monomers, epoxide monomers, silane monomers, thio-ene monomers, thio-yne monomers, or vinyl ether monomers.

3. The method of fabrication of a switchable light-collimating film according to claim 1, wherein the bistable electrophoretic fluid comprises polymer-functionalized pigment particles and free polymer in a non-polar solvent.

4. The method of fabrication of a switchable light-collimating film according to claim 3, wherein the pigment particles are functionalized with a polyacrylate, polystyrene, polynaphthalene, or polydimethylsiloxane.

5. The method of fabrication of a switchable light-collimating film according to claim 3, wherein the free polymer comprises polyisobutylene or copolymers including ethylene, propylene, or styrene monomers.

6. The method of fabrication of a switchable light-collimating film according to claim 1, wherein the first row is separated from the second row by at least three times the width of the elongated chambers.

7. The method of fabrication of a switchable light-collimating film according to claim 1, wherein the adjacent elongated chambers within the first row are separated by a gap of less than 30 µm.

8. The method of fabrication of a switchable light-collimating film according to claim 1, wherein the collimating layer has a thickness of less than 500 µm.

9. The method of fabrication of a switchable light-collimating film according to claim 1, wherein the collimating layer comprises a polyacrylate.

10. The method of fabrication of a switchable light-collimating film according to claim 1, wherein the first or second light-transmissive electrode layer comprises indium-tin-oxide.

11. The method of fabrication of a switchable light-collimating film according to claim 1, wherein the sealing layer comprises cellulose, gelatin, a polyacrylate, a polyvinyl alcohol, a polyethylene, a poly(vinyl) acetate, a poly(vinyl) pyrrolidone, a polyurethane, or a copolymer of any of the aforementioned polymers.

12. The method of fabrication of a switchable light-collimating film according to claim 1, wherein a height of the plurality of the elongated chambers is equal to or less than thickness of the collimating layer, the width of the plurality of the elongated chambers is between 5 µm and 150 µm, and the length of the plurality of elongated chambers is between 200 µm and 5 mm.

13. The method of fabrication of a switchable light-collimating film according to claim 1, wherein the bistable electrophoretic fluid comprises polymer-functionalized pigment particles and free polymer in a non-polar solvent.

14. A method of fabrication of a switchable light-collimating film comprising the steps:
providing a first light-transmissive electrode layer;
depositing an embossing composition on the surface of the first light-transmissive electrode layer, creating a layer of embossing composition;
embossing the embossing composition at a temperature higher than the glass transition temperature of the layer of the embossing composition material, using a pre-patterned embossing tool, creating a patterned layer;
releasing the patterned layer from the embossing tool, creating a collimating layer having a plurality of elongate chambers, each elongated chamber having an opening, each elongated chamber having height, length (L), and width (W), the collimating layer having a thickness of at least 20 µm, the plurality of the elongated chambers being arranged in rows and columns when the collimating layer is viewed from above, the longer dimension of the elongated chambers running along rows, first row of elongated chambers including a gap between elongated chambers of first column and second column, second row of elongated chambers including a gap between elongated chambers of first column and second column, third row of elongated chambers including a gap between elongated chambers of first column and second column, the gap between elongated chambers of first column and second column in the first row being offset horizontally from the gap between elongated chambers of first column and second column in the second row, the gap between elongated chambers of first column and second column in the second row being offset horizontally from the gap between elongated chambers of first column and second column in the third row, the gap between elongated chambers of first column and second column in the first row being offset horizontally from the gap between elongated chambers of first column and second column in the third row,
filling each chamber of the plurality of the elongated chambers through their opening with a bistable electrophoretic fluid comprising pigment particles;
sealing the openings of the plurality of filled elongated chambers with a sealing composition, forming a sealing layer spanning the opening of each of the plurality of the elongated chambers;
attaching an optically clear adhesive layer and a release layer onto the sealing layer, wherein the optically clear adhesive layer is disposed between the sealing layer and the release layer.

* * * * *